(12) United States Patent
Grois et al.

(10) Patent No.: US 12,088,855 B2
(45) Date of Patent: Sep. 10, 2024

(54) METHODS, SYSTEMS, AND APPARATUSES FOR ADAPTIVE PROCESSING OF VIDEO CONTENT WITH FILM GRAIN

(71) Applicant: Comcast Cable Communications, LLC, Philadelphia, PA (US)

(72) Inventors: Dan Grois, Beer-Sheva (IL); Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/724,094

(22) Filed: Apr. 19, 2022

(65) Prior Publication Data
US 2022/0337883 A1  Oct. 20, 2022

Related U.S. Application Data

(60) Provisional application No. 63/176,734, filed on Apr. 19, 2021.

(51) Int. Cl.
*H04N 19/86* (2014.01)
*G06T 5/70* (2024.01)
*H04N 19/117* (2014.01)
*H04N 19/124* (2014.01)
*H04N 19/134* (2014.01)

(52) U.S. Cl.
CPC ............... *H04N 19/86* (2014.11); *G06T 5/70* (2024.01); *H04N 19/117* (2014.11); *H04N 19/124* (2014.11); *H04N 19/134* (2014.11)

(58) Field of Classification Search
None
See application file for complete search history.

(56) References Cited

U.S. PATENT DOCUMENTS

2006/0140278 A1* 6/2006 Gomila ............... H04N 19/86
382/254
2008/0152296 A1* 6/2008 Oh .................... H04N 19/80
375/E7.193

(Continued)

FOREIGN PATENT DOCUMENTS

EP   1641274 A1   3/2006
WO  WO 2006/047138 A2  5/2006

OTHER PUBLICATIONS

Gomila, C. et al: "SEI message for film grain encoding", Joint Video Team (JVT) of ISO/IEC MPEG & ITU-T VCEG (ISO/IEC JTC1/SC29/WG11 and Itu-T SG16 Q6), May 23, 2003, pp. 1-14.

*Primary Examiner* — Samuel D Fereja
(74) *Attorney, Agent, or Firm* — Ballard Spahr LLP

(57) ABSTRACT

Methods, systems, and apparatuses for adaptive processing of video content to remove noise, such as film grain noise, without substantially affecting visual presentation quality are described herein. A computing device may determine a plurality of film grain parameters associated with film grain noise present within one or more portions of a content item. The computing device may determine at least one encoding parameter based on the plurality of film grain parameters. The computing device may encode the content item based on the at least one encoding parameter. The computing device may send an encoding message to at least one user device/client device, which may in turn use the encoding message to decode the content item.

20 Claims, 17 Drawing Sheets
(8 of 17 Drawing Sheet(s) Filed in Color)

(56) References Cited

U.S. PATENT DOCUMENTS

| | | | |
|---|---|---|---|
| 2008/0181311 A1 | 7/2008 | Zhang | |
| 2010/0080455 A1* | 4/2010 | Gomila | H04N 19/117 |
| | | | 382/162 |
| 2011/0176058 A1 | 7/2011 | Biswas | |
| 2016/0021399 A1* | 1/2016 | Gomila | H04N 19/46 |
| | | | 375/240.18 |
| 2016/0198165 A1 | 7/2016 | Zhou | |
| 2022/0191501 A1* | 6/2022 | Guionnet | H04N 19/615 |
| 2022/0222871 A1* | 7/2022 | Abdelhamed | G06V 10/507 |

* cited by examiner

*tC* Threshold Values as a Function of *QP*

*β* Threshold Values as a Function of *QP*

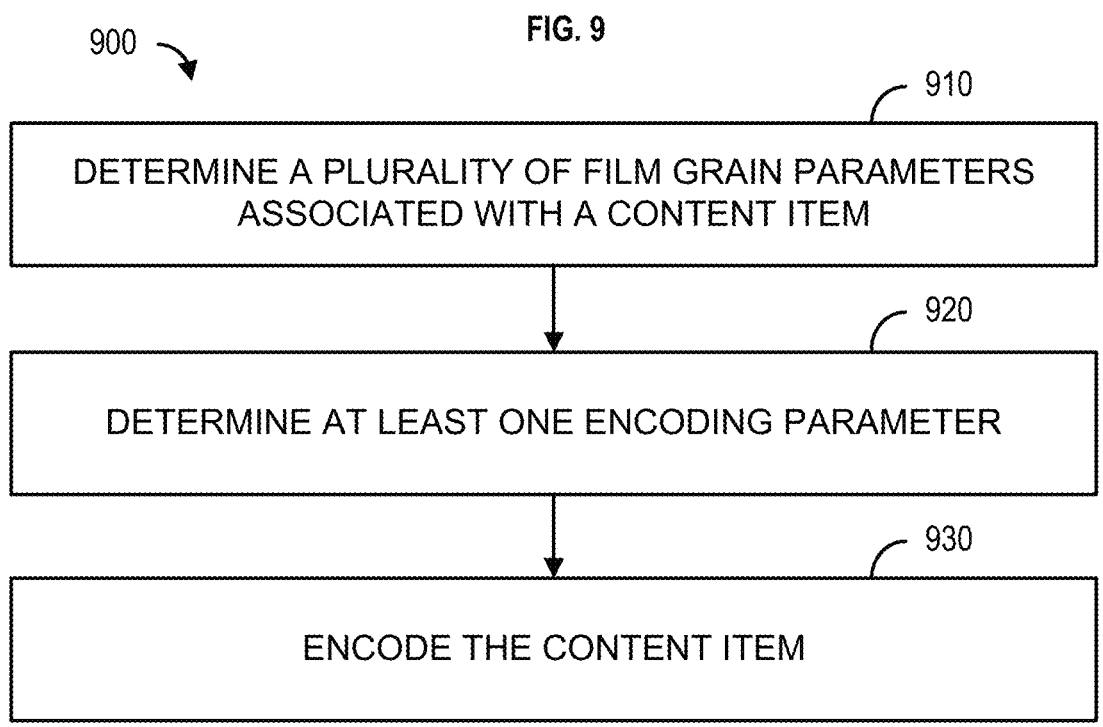

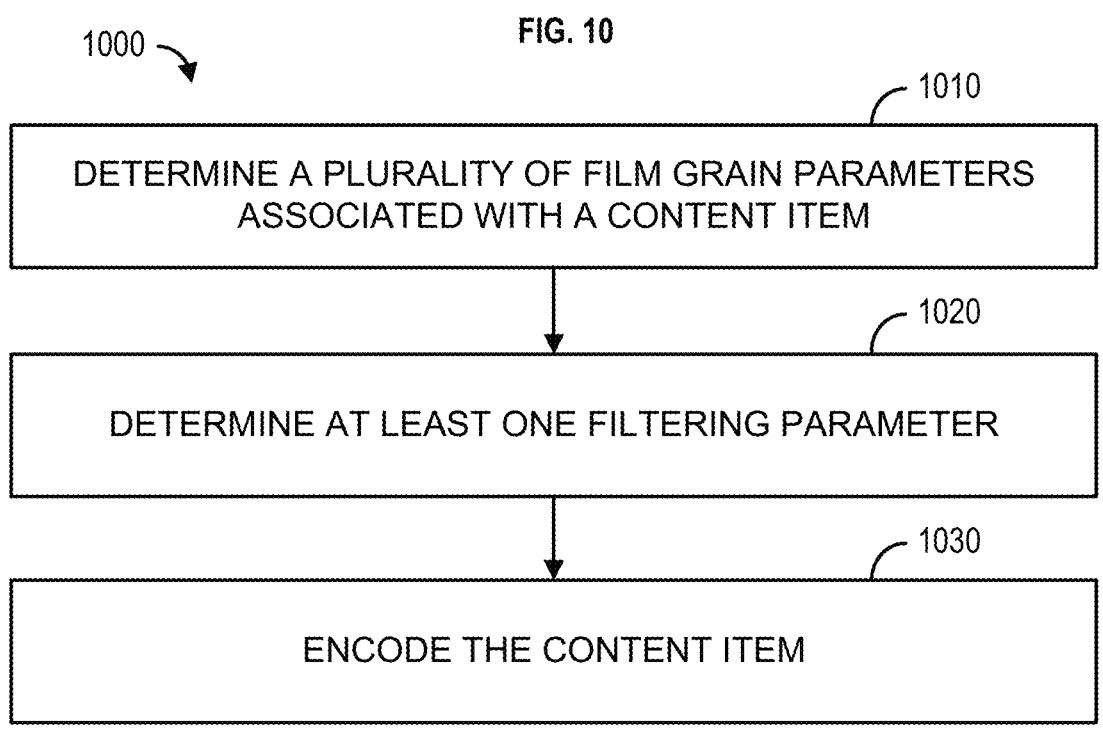

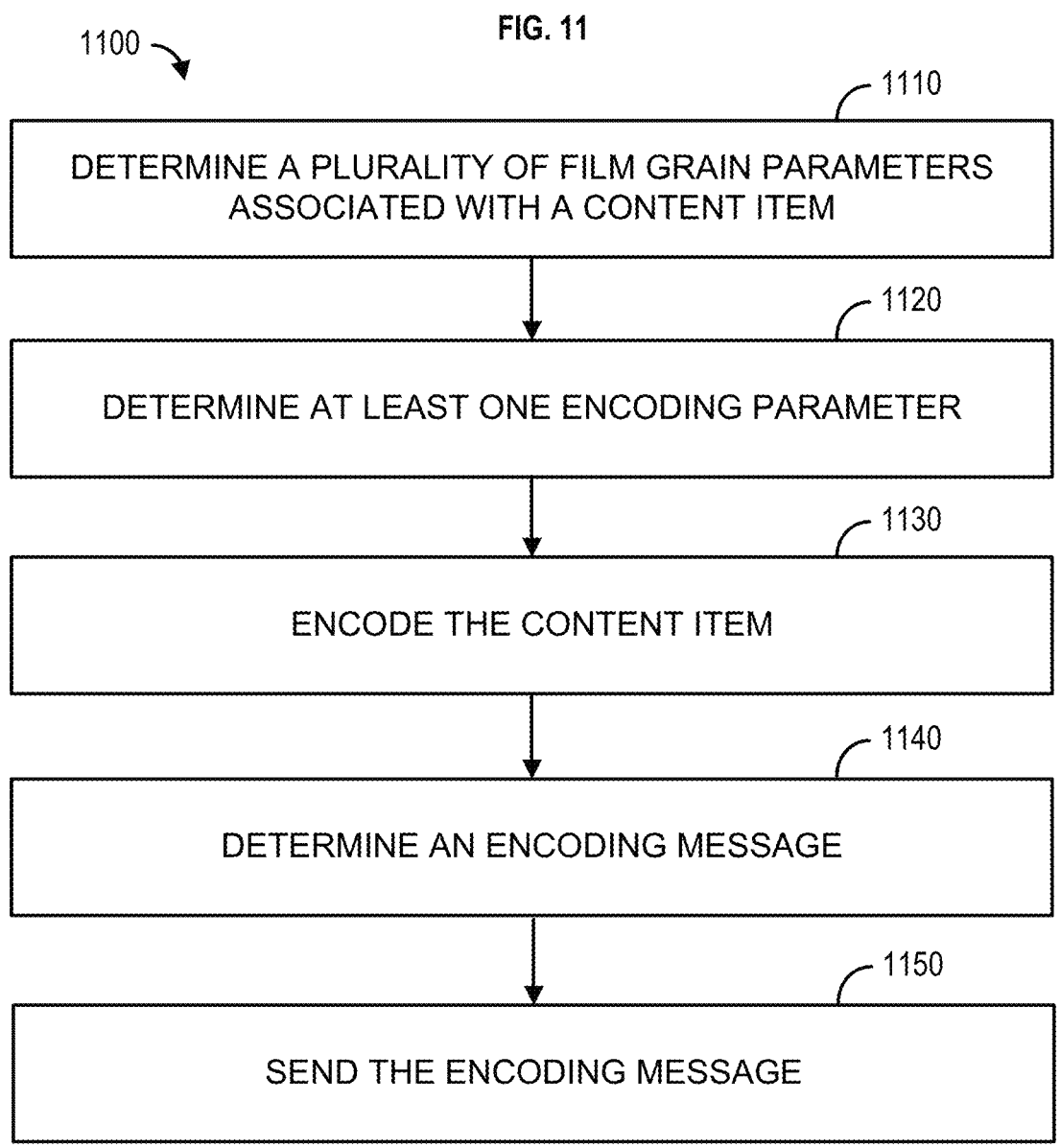

METHODS, SYSTEMS, AND APPARATUSES FOR ADAPTIVE PROCESSING OF VIDEO CONTENT WITH FILM GRAIN

CROSS-REFERENCE TO RELATED PATENT APPLICATION

This application claims priority to U.S. Provisional Application No. 63/176,734, filed on Apr. 19, 2021, the entirety of which is incorporated by reference herein.

BACKGROUND

Noise in video content is very difficult to compress due to its inherent lack of correlation with the video content, thereby inevitably leading to a reduction in compression efficiency. Existing processing solutions for video content account for this issue by performing pre-filtering operations during video coding, which generally refers to performing a set of operations that lead to improving compression gain by smoothing the video content and thereby making it more compressible. However, in addition to removing noise, these existing solutions almost always remove some essential information from the video content, such as fine details of objects, edges, corners, etc., thereby reducing visual presentation quality to at least some extent. These and other considerations are discussed herein.

SUMMARY

It is to be understood that both the following general description and the following detailed description are exemplary and explanatory only and are not restrictive. This summary is not intended to identify critical or essential features of the disclosure, but merely to summarize certain features and variations thereof. Other details and features will be described in the sections that follow.

Methods, systems, and apparatuses for adaptive processing of video content to remove noise without substantially affecting visual presentation quality are described herein. A computing device may determine a plurality of film grain parameters associated with film grain noise present within one or more portions of a content item. The computing device may determine the plurality of film grain parameters using one or more machine learning techniques. The computing device may determine at least one encoding parameter based on the plurality of film grain parameters. The at least one encoding parameter may comprise a component of an encoding cost function and/or at least one filtering parameter. The computing device may encode a portion—or the entirety—of the content item based on the at least one encoding parameter/filtering parameter. For example, the computing device may determine a de-noised version of a portion—or the entirety—of the content item based on the plurality of film grain parameters. The de-noised version may lack the film grain noise. The computing device may encode the de-noised version of the content item. The computing device may determine/generate an encoding message based on the at least one encoding parameter/filtering parameter. The computing device may send the encoding message to the at least one user device/client device, which may in turn use the encoding message to decode the content item.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the present methods and systems. The patent or application file contains at least one drawing executed in color. Copies of this patent or patent application publication with color drawing(s) will be provided by the Office upon request and payment of the necessary fee.

FIG. 9 shows a flowchart for an example method;
FIG. 10 shows a flowchart for an example method;
and
FIG. 11 shows a flowchart for an example method.

DETAILED DESCRIPTION

Figure 1:
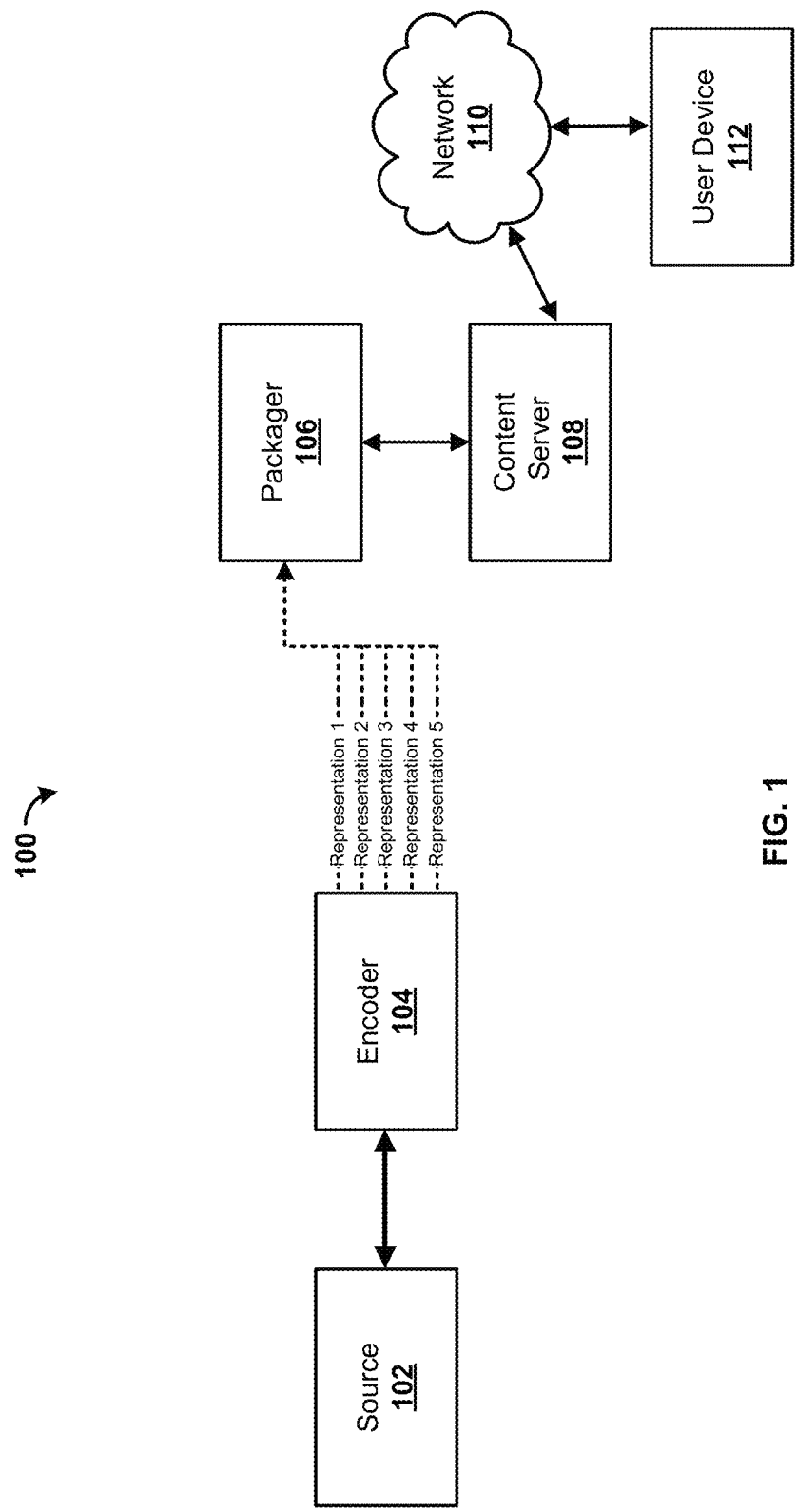
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods.

Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or some other video file format, whether such format is presently known or developed in the future. The content items described herein may be electronic representations of music, spoken words, or other audio, which may be but is not limited to data files adhering to MPEG-1 audio, MPEG-2 audio, MPEG-2 and MPEG-4 advanced audio coding, MPEG-H, AC-3 (Dolby Digital), E-AC-3 (Dolby Digital Plus), AC-4, Dolby Atmos®, DTS®, and/or any other format configured to store electronic audio, whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

Provided herein are methods, systems, and apparatuses for adaptive processing of video content with noise. For example, most video content is compressed prior to consumption at user/client devices at least to some extent, and most video content to be compressed is not free of noise. Some types of noise are inherent in certain video production processes, such as film grain noise that is generated during analog video production due to exposure and development of silver-halide crystals within analog film. Noise that is present within video content may be difficult to compress due to its inherent lack of correlation with the underlying video content, which may lead to a reduction in video compression efficiency.

A particular type of noise that presents compression challenges is noise related to film grain. Such film grain-related noise (referred to herein as "film grain noise" or simply "film grain") is inherent in analog video production as described above. The present methods, systems, and apparatuses may adaptively process video content to remove film grain noise without substantially affecting visual presentation quality.

A computing device, such as an encoder, may determine a plurality of film grain parameters associated with a content item. The plurality of film grain parameters may be associated with film grain noise present within one or more frames of the content item. The plurality of film grain parameters may comprise a film grain pattern, a film grain size, a film grain density, a film grain color, a film grain intensity, a combination thereof, and/or the like. The computing device may determine the plurality of film grain parameters using one or more machine learning techniques. For example, the computing device may determine the plurality of film grain parameters using a neural network. The neural network may be trained based on a plurality of training content items that each comprise labeled (e.g., known) film grain parameters. The plurality of film grain parameters may be based on the labeled film grain parameters used for training the neural network. For example, the plurality of film grain parameters may comprise a subset (or an entirety) of the labeled film grain parameters used for training the neural network.

The computing device may determine at least one encoding parameter based on the plurality of film grain parameters. The at least one encoding parameter may comprise a component of an encoding cost function. The encoding cost function may be minimized to select a best encoding mode during an encoding process of the content item. The computing device may determine the at least one encoding parameter by determining the component of the encoding cost function for at least a portion of the content item (e.g., a segment, fragment, frame(s), etc.). For example, the computing device may determine the component of the encoding cost function for at least the portion of the content item based on the plurality of film grain parameters associated with at least the portion of the content item. The portion of the content item may comprise a prediction unit (PU), a coding unit (CU), a coding tree unit (CTU), a combination thereof, and/or the like. The component of the encoding cost function may comprise a Lagrangian multiplier, which may be determined based on a quantization parameter (e.g., a compression parameter) associated with the content item. The component of the encoding cost function may comprise a quality factor, which may be determined based on a quality factor that is derived based on the plurality of film grain parameters.

The at least one encoding parameter may comprise at least one filtering parameter. The computing device may determine the at least one filtering parameter in a variety of ways. For example, the computing device may determine the at least one filtering parameter by determining a strength of a deblocking filter based on the plurality of film grain parameters. As another example, the computing device may determine the at least one filtering parameter by determining a plurality of coding block borders to be filtered based on the plurality of film grain parameters. Each coding block border of the plurality of coding block borders may comprise a vertical direction or a horizontal direction. In determining plurality of coding block borders to be filtered, the computing device may determine a quantity and/or a direction of coding block borders to be filtered.

As a further example, the computing device may determine the at least one filtering parameter by determining a first threshold parameter (e.g., a β parameter) and second threshold parameter. (e.g., a tC parameter). The first threshold parameter and the second threshold parameter may be determined based on a quantization parameter associated with at least two neighboring blocks of at least one frame of the content item. The computing device may determine a quantity of block borders to be filtered based on the first threshold parameter. The computing device may determine a strength of a deblocking filter based on the second threshold parameter. The strength of the deblocking filter may be used to determine a plurality of pixels of the at least one frame of the content item to be modified. The plurality of pixels may be associated with a common block border of the at least two neighboring blocks. The computing device may determine a maximum quantity of modifications for each pixel of the plurality of pixels. For example, the computing device may determine the maximum quantity of modifications based on the strength of the deblocking filter and the quantization parameter. The computing device may determine an offset for the first threshold parameter and an offset for the second threshold parameter based on the plurality of film grain parameters and the quantization parameter. For example, the computing device may adjust the quantization parameter, and the adjustment to the quantization parameter may be used to determine the offset for the first threshold parameter and the offset for the second threshold parameter.

The computing device may encode a portion—or the entirety—of the content item based on the at least one encoding parameter/filtering parameter. For example, the computing device may determine a de-noised version of a portion—or the entirety—of the content item based on the plurality of film grain parameters. The de-noised version may lack the film grain noise present in the pre-encoded version of the portion—or the entirety—of the content item. The computing device may encode the de-noised version of the portion—or the entirety—of the content item. The computing device may determine/generate an encoding message. For example, the computing device may determine/generate the encoding message based on the at least one encoding parameter/filtering parameter. The encoding message may comprise a Supplemental Enhancement Information (SEI) message. The computing device may send the encoding message to the at least one user device/client device. The at least one user device/client device may use the encoding message to decode the content item (e.g., the encoded de-noised version of the portion—or the entirety—of the content item). For example, the at least one user device/client device may use the encoding message to synthesize the film grain noise that was present in the pre-encoded version of the content item. In this way, the encoding message may be used to decode the content item and preserve the visual appearance of the content item (e.g., with the film grain noise).

The methods, systems, and apparatuses described herein may be used to adaptively process an entire content item (e.g., an entire video) or a portion of a content item (e.g., a frame, segment, fragment, etc.). For example, an entire content item may be adaptively processed to remove noise present within any portion of the content item by determining a plurality of film grain parameters associated with the content item as a whole. As another example, a portion of a content item, such as a frame, a segment, a fragment, etc., may be adaptively processed to remove noise present within that portion by determining a plurality of film grain parameters associated with that portion of the content item. Other examples are possible as well. It is to be understood that the methods, systems, and apparatuses described herein may be used to adaptively process as much—or as little—of a content item that is desired and/or required.

FIG. 1 shows an example system 100 for adaptive processing of video content with noise, such as film grain noise. The system 100 may comprise a plurality of computing devices/entities in communication via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, etc.) and terrestrial paths (e.g., wired paths, a direct feed source via a direct line, etc.). The network 110 may comprise public networks, private networks, wide area networks (e.g., Internet), local area networks, and/or the like. The network 110 may comprise a content access network, content distribution network, and/or the like. The network 110 may be configured to provide content from a variety of sources using a variety of network paths, protocols, devices, and/or the like. The content delivery network and/or content access network may be managed (e.g., deployed, serviced) by a content provider, a service provider, and/or the like. The network 110 may deliver content items from a source(s) to a user device(s).

The system 100 may comprise a source 102, such as a server or other computing device. The source 102 may receive source streams for a plurality of content items. The source streams may be live streams (e.g., a linear content stream), video-on-demand (VOD) streams, or any other type of content stream. The source 102 may receive the source streams from an external server or device (e.g., a stream capture source, a data storage device, a media server, etc.). The source 102 may receive the source streams via a wired or wireless network connection, such as the network 110 or another network (not shown).

The source 102 may comprise a headend, a video-on-demand server, a cable modem termination system, and/or the like. The source 102 may provide content (e.g., video, audio, games, applications, data) and/or content items (e.g., video, streaming content, movies, shows/programs, etc.) to user devices. The source 102 may provide streaming media, such as live content, on-demand content (e.g., video-on-demand), content recordings, and/or the like. The source 102 may be managed by third-party content providers, service providers, online content providers, over-the-top content providers, and/or the like. A content item may be provided via a subscription, by individual item purchase or rental, and/or the like. The source 102 may be configured to provide content items via the network 110. Content items may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The source 102 may provide uncompressed content items, such as raw video data, comprising one or more portions (e.g., frames/slices, groups of pictures (GOP), coding units (CU), coding tree units (CTU), etc.). It should be noted that although a single source 102 is shown in FIG. 1, this is not to be considered limiting. In accordance with the described techniques, the system 100 may comprise a plurality of sources 102, each of which may receive any number of source streams.

The system 100 may comprise an encoder 104, such as a video encoder, a content encoder, etc. The encoder 104 may be configured to encode one or more source streams (e.g., received via the source 102) into a plurality of content items/streams at various bitrates (e.g., various representations). For example, the encoder 104 may be configured to encode a source stream for a content item at varying bitrates for corresponding representations (e.g., versions) of a content item for adaptive bitrate streaming. As shown in FIG. 1, the encoder 104 may encode a source stream into Representations 1-5. It is to be understood that the FIG. 1 shows five representations for explanation purposes only. The encoder 104 may be configured to encode a source stream into fewer or greater representations. Representation 1 may be associated with a first resolution (e.g., 480p) and/or a first bitrate (e.g., 4 Mbps). Representation 2 may be associated with a second resolution (e.g., 720p) and/or a second bitrate (e.g., 5 Mbps). Representation 3 may be associated with a third resolution (e.g., 1080p) and/or a third bitrate (e.g., 6 Mbps). Representation 4 may be associated with a fourth resolution (e.g., 4K) and/or a first bitrate (e.g., 10 Mbps). Representation 5 may be associated with a fifth resolution (e.g., 8K) and/or a fifth bitrate (e.g., 15 Mbps). Other examples resolutions and/or bitrates are possible.

The encoder 104 may be configured to determine one or more encoding parameters. The encoding parameters may be based on one or more content streams encoded by the encoder 104. For example, an encoding parameter may comprise at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may comprise a value indicating at least one of a low complexity to encode, a medium complexity to encode, or a high complexity to encode. As a further example, an encoding parameter may comprise a transform coefficient(s), a quantization parameter value(s), a motion vector(s), an inter-prediction parameter value(s), an intra-prediction parameter value(s), a motion estimation parameter value(s), a partitioning parameter value(s), a combination thereof, and/or the like. The encoder 104 may be configured to insert encoding parameters into the content streams and/or provide encoding parameters to other devices within the system 100.

Encoding a content stream/item may comprise the encoder 104 partitioning a portion and/or frame of the content stream/item into a plurality of coding tree units (CTUs). Each of the CTUs may comprise a plurality of pixels. The CTUs may be partitioned into coding units (CUs) (e.g., coding blocks). For example, a content item may include a plurality of frames (e.g., a series of frames/pictures/portions, etc.). The plurality of frames may comprise I-frames, P-frames, and/or B-frames. An I-frame (e.g., an Intra-coded picture) may include and/or represent a complete image/picture. A P-frame (e.g., a Predicted picture/delta frame) may comprise only the changes in an image from a previous frame. For example, in a scene where a person moves across a stationary background, only the person's movements need to be encoded in a corresponding P-frame in order to indicate the change in the person's position with respect to the stationary background. To save space and computational resources, the encoder 104 may not store information/data indicating any unchanged background pixels in the P-frame. A B-frame (e.g., a Bidirectional predicted picture) may enable the encoder 104 to save more space and computational resources by storing differences between a current frame and both a preceding and a following frame. Each frame of a content item may be divided into a quantity of partitions. Each partition may comprise a plurality of pixels. Depending on a coding format (e.g., a CODEC), the partition may be a block, a macroblock, a CTU, etc. The order in which I-frames, P-frames, and B-frames are arranged is referred to herein as a Group of Pictures (GOP) structure—or simply a GOP. The encoder 104 may encode frames as open GOPs or as closed GOPs.

While the description herein refers to the encoder 104 encoding entire frames of content, it is to be understood that the functionality of the encoder 104 may equally apply to a portion of a frame rather than an entire frame. A portion of a frame, as described herein, may comprise one or more coding tree units/blocks (CTUs), one or more coding units/blocks (CUs), a combination thereof, and/or the like. For example, the encoder 104 may allocate a time budget for encoding at least a portion of each frame of a content item. When the 104 encoder takes longer than the allocated time budget to encode at least a portion of a given frame(s) of the content item at a first resolution (e.g., for Representation 5), the encoder 104 may begin to encode frames of the content item—or portions thereof—at a second resolution (e.g., a lower resolution/bit rate, such as Representations 1-4) in order to allow the encoder 104 to "catch up." As another example, when the encoder 104 takes longer than the allocated time budget to encode at least a portion of at least one frame for the first representation of the content item at the first resolution, the encoder 104 may use content-aware encoding techniques when encoding further frames—or portions thereof—for the first representation. The content-aware encoding techniques may comprise, as an example, adaptive resolution changes, reference picture resampling, etc. The encoder 104 may use the content-aware encoding techniques to "reuse" encoding decisions for corresponding frames that were previously encoded for the second representation at the second resolution.

As described herein, the encoder 104 may encode frames of content (e.g., a content item(s)) as open GOPs or as closed GOPs. For example, an open GOP may include B-frames that refer to an I-frame(s) or a P-frame(s) in an adjacent GOP. A closed GOP, for example, may comprise a self-contained GOP that does not rely on frames outside that GOP.

The encoder 104 may vary a bit rate and/or a resolution of encoded content by downsampling and/or upsampling one or more portions of the content. For example, when downsampling, the encoder 104 may lower a sampling rate and/or sample size (e.g., a number of bits per sample) of the content. The encoder 104 may downsample content to decrease an overall bit rate when sending encoded portions of the content to the content server 108 and or the user device 110. The encoder 104 may downsample, for example, due to limited bandwidth and/or other network/hardware resources. An increase in available bandwidth and/or other network/hardware resources may cause the encoder 104 to upsample one or more portions of the content. For example, when upsampling, the encoder 104 may use a coding standard that permits reference frames (e.g., reference pictures) from a first representation to be resampled (e.g., used as a reference) when encoding another representation. The processes required when downsampling and upsampling by the encoder 104 may be referred to as content-aware encoding techniques as described herein (e.g., adaptive resolution changes, reference picture resampling, etc.).

Some encoding standards, such as the Versatile Video Coding (VVC) codec (e.g., H.266), permit enhanced content-aware encoding techniques referred to herein interchangeably as called adaptive resolution change ("ARC") and/or reference picture resampling ("RPR"). For example, the encoder 104 may utilize ARC to upsample and/or downsample reference pictures in a GOP "on the fly" to improve coding efficiency based on current network conditions and/or hardware conditions/resources. The encoder 104 may downsample for various reasons. For example, the encoder 104 may downsample when the source 102 is no longer able to provide a source stream of the content at a requested resolution (e.g., a requested representation). As another example, the encoder 104 may downsample when network bandwidth is no longer sufficient to timely send content at a requested resolution (e.g., a requested representation) to the user device 112. As another example, the encoder 104 may downsample when a requested resolution (e.g., a requested representation) is not supported by a requesting device (e.g., the user device 112). Further, as discussed herein, the encoder 104 may downsample when the 104 encoder takes longer than an allocated time budget to encode at least a portion of a given frame(s) of requested content item at a requested resolution (e.g., a requested representation).

The encoder 104 may upsample for various reasons. For example, the encoder 104 may upsample when the source 102 becomes able to provide a source stream of the content at a higher resolution (e.g., a representation with a higher bit rate than currently being output). As another example, the encoder 104 may upsample when network bandwidth permits the encoder 104 to timely send content at a higher resolution to the user device 112. As another example, the encoder 104 may upsample when a higher is supported by a requesting device (e.g., the user device 112).

The system 100 may comprise a packager 106. The packager 106 may be configured to receive one or more content items/streams from the encoder 104. The packager 106 may be configured to prepare content items/streams for distribution. For example, the packager 106 may be configured to convert encoded content items/streams into a plurality of content fragments. The packager 106 may be configured to provide content items/streams according to adaptive bitrate streaming. For example, the packager 106 may be configured to convert encoded content items/streams at various representations into one or more adaptive bitrate streaming formats, such as Apple HTTP Live Streaming (HLS), Microsoft Smooth Streaming, Adobe HTTP Dynamic Streaming (HDS), MPEG DASH, and/or the like. The packager 106 may pre-package content items/streams and/or provide packaging in real-time as content items/streams are requested by user devices, such as a user device 112. The user device 112 may be a content/media player, a set-top box, a client device, a smart device, a mobile device, a user device, etc.

The system 100 may comprise a content server 108. For example, the content server 108 may be configured to receive requests for content, such as content items/streams. The content server 108 may identify a location of a requested content item and provide the content item—or a portion thereof—to a device requesting the content, such as the user device 112. The content server 108 may comprise a Hypertext Transfer Protocol (HTTP) Origin server. The content server 108 may be configured to provide a communication session with a requesting device, such as the user device 112, based on HTTP, FTP, or other protocols. The content server 108 may be one of a plurality of content server distributed across the system 100. The content server 108 may be located in a region proximate to the user device 112. A request for a content stream/item from the user device 112 may be directed to the content server 108 (e.g., due to the location and/or network conditions). The content server 108 may be configured to deliver content streams/items to the user device 112 in a specific format requested by the user device 112. The content server 108 may be configured to provide the user device 112 with a manifest file (e.g., or other index file describing portions of the content) corresponding to a content stream/item. The content server 108 may be configured to provide streaming content (e.g., unicast, multicast) to the user device 112. The content server 108 may be configured to provide a file transfer and/or the like to the user device 112. The content server 108 may cache or otherwise store content (e.g., frequently requested content) to enable faster delivery of content items to users.

The content server 108 may receive requests for content items, such as requests for high-resolution videos and/or the like. The content server 108 may receive requests for the content items from the user device 112 and/or other user devices/client devices (not shown in FIG. 1). The content server 108 may send (e.g., to the user device 112) one or more portions of the requested content items at varying bit rates (e.g., representations 1-5). For example, the user device 112 and/or other user devices/client devices may request that the content server 108 send Representation 1 of a content item based on a first set of network conditions (e.g., lower-levels of bandwidth, throughput, etc.). As another example, the user device and/or other user devices/client devices may request that the content server 108 send Representation 5 based on a second set of network conditions (e.g., higher-levels of bandwidth, throughput, etc.). The content server 108 may receive encoded/packaged portions of the requested content item from the encoder 104 and/or the packager 106 and send (e.g., provide, serve, transmit, etc.) the encoded/packaged portions of the requested content item to the user device 112 and/or other user devices/client devices.

The system 100 may adaptively process requested content items that comprise various types of noise. For example, one or more devices/entities of the system 100, such as the source 102, the encoder 104, the packager 106, and/or the content server 108, may compress requested content items (or a portion(s) thereof) prior to sending the requested content items (or the portion(s) thereof) to the user device 112 for consumption (e.g., output, display, playback, etc.). The requested content items (or a portion(s) thereof) may comprise, as an example, film grain noise. As described herein, such film grain-related noise (referred to herein as "film grain noise" or simply "film grain") may be generated during analog video production due to exposure and development of silver-halide crystals within analog film.

As a result, in the analog video production process, film grain noise may be unavoidable. In turn, when corresponding analog film is scanned and digitized, the film grain may still remain as a part of the video content, and the film grain's random distribution may lead to relatively low coding/compression gains the corresponding content item is not processed accordingly. Additionally, motion estimation efficiency may be reduced as well, which may lead to lower compression gains.

Figure 2A:
FIG. 2A shows example video frames.
Figure 2B:
FIG. 2B shows example video frames.

FIG. 2A shows an example frame 202 (e.g., picture) of a content item comprising film grain. Such film grain may be removed by performing pre-filtering processes (e.g., de-noising the original video content) prior to encoding. These pre-filtering processes may remove the film grain and result in de-noised versions of video frames that appear too artificial and, as a result, may be perceived differently from the original artistic intent. FIG. 2B shows an example de-noised version 204 of the frame 202. The de-noised version 204 may not comprise the film grain that may be seen in the frame 202. Without the film grain, the de-noised version 204 may appear too artificial to some viewers. To account for the film grain's impact on viewer experience, the film grain that is removed by the pre-filtering processes may be synthesized and added back to the content item by a decoder of the user device 112 (or any other user device/client device comprising a decoder). For example, the user device 112 may receive an encoding message, such as a Supplemental Enhancement Information (SEI) message, that comprises a plurality of film grain parameters. The user device 112 may use the plurality of film grain parameters, such as film grain pattern and intensity, to synthesize the film grain back to the content item when the content item is output, displayed, played back, etc.

Figure 2C:
FIG. 2C shows example video frames.
Figure 2D:
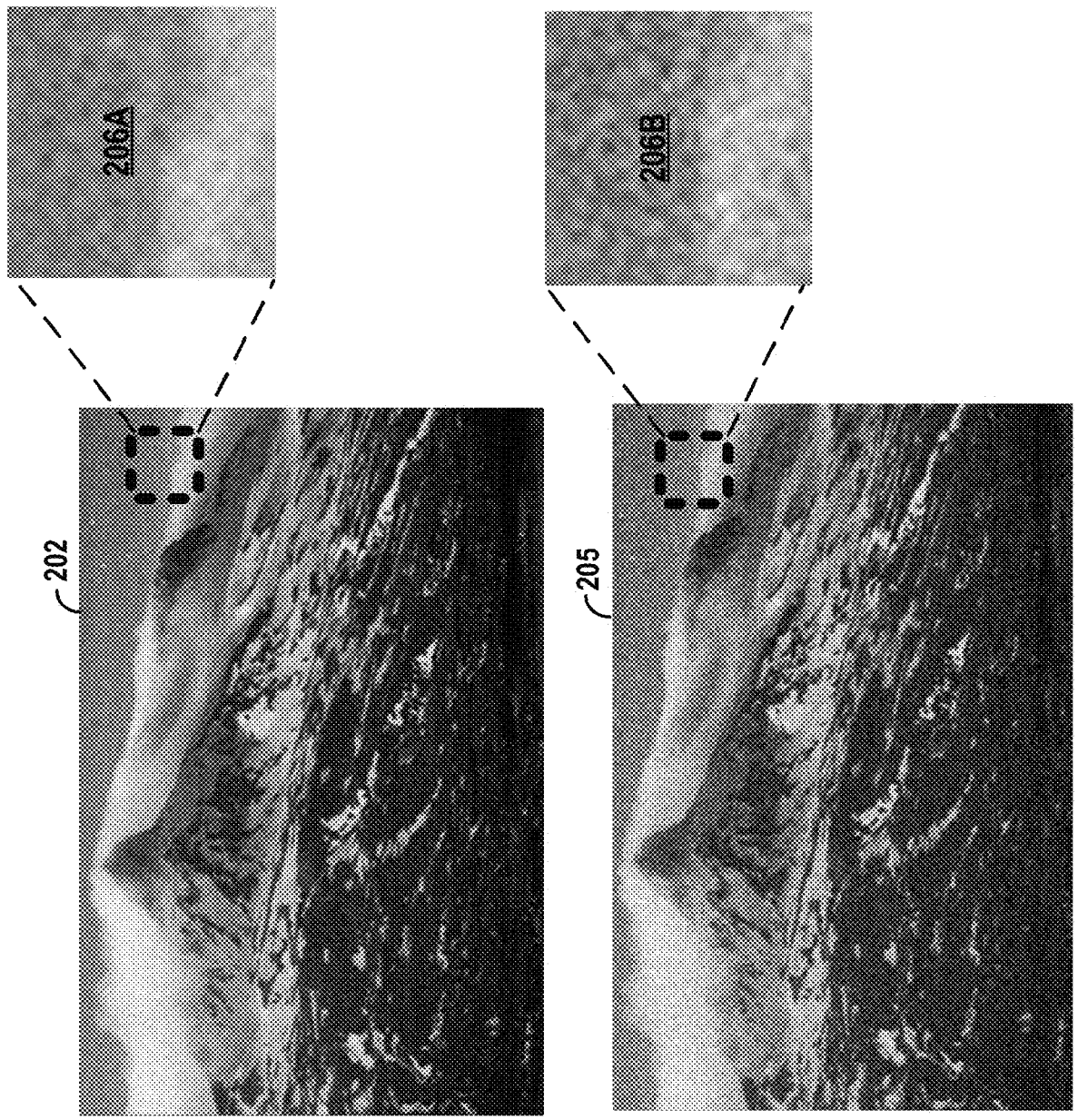
FIG. 2D shows example video frames.

The plurality of film grain parameters (e.g., film grain characteristics) may vary across frames, segments, fragments, scenes, etc., of a particular content item (e.g., based on lighting, film type, etc.) and/or across content items. For example, a content item comprising a movie that was filmed in the 1980s may comprise "heavier" film grain (also referred to as "heavy film grain" herein) as compared to a movie that was filmed in the 1990s or 2000s. FIG. 2C shows an example frame 205 depicting imagery that is similar to the imagery shown in the frame 202, except the frame 205 comprises heavier film grain as compared to the "light" film grain in the frame 202. The plurality of film grain parameters associated with the frame 202 (e.g., pattern, size, density, color, intensity, etc.) may differ from the plurality of film grain parameters associated with the frame 205 as a result of the heavier film grain in the frame 205. For example, FIG. 2D shows the frames 202 and 205 and exploded views 206A and 206B of a portion of each. As shown in FIG. 2D, the film grain present in the exploded view 206A, which is based the plurality of film grain parameters associated with the frame 202, has visual characteristics that differ from the film grain present in the exploded view 206B, which is based the plurality of film grain parameters associated with the frame 205.

The system 100 may adaptively process requested content items to remove film grain noise for encoding purposes without substantially affecting visual presentation quality at the user device 112 upon the content item being decoded and consumed (e.g., output, displayed, played back). That is, the system 100 may be configured to account for the nearly endless number of possible permutations of film grain parameters (e.g., patterns, sizes, densities, intensity levels, etc.) across various content items. While the following description refers to the encoder 104 adaptively processing a content item, it is to be understood that any device/entity of the system 100 may be configured to perform some—or all—of the functionality described below with respect to the encoder 104.

The user device 112 may request a content item. The source 102 may provide a raw version of the content item (e.g., a full-resolution feed/file, a master feed/file, a mezzanine feed/file, etc.) to the encoder 104. The encoder 104 may determine a plurality of film grain parameters associated with the content item. The plurality of film grain parameters may be associated with film grain noise present within one or more frames of the content item. The plurality of film grain parameters may comprise a film grain pattern, a film grain size, a film grain density, a film grain color, a film grain intensity, a combination thereof, and/or the like. The encoder 104 may determine the plurality of film grain parameters using one or more machine learning techniques. For example, the encoder 104 may determine the plurality of film grain parameters using a neural network. The neural network may be trained based on a plurality of training content items that each comprise labeled (e.g., known) film grain parameters. The plurality of film grain parameters may be based on the labeled film grain parameters used for training the neural network. For example, the plurality of film grain parameters may comprise a subset (or an entirety) of the labeled film grain parameters used for training the neural network. The one or more machine learning techniques described herein are further discussed herein with respect to FIGS. 4-7.

The encoder 104 may determine at least one encoding parameter based on the plurality of film grain parameters. The at least one encoding parameter (e.g., at least one optimal encoding parameter) may comprise a quantization parameter (QP) for at least one portion of the content item. The portion of the content item may comprise a prediction unit (PU), a coding unit (CU), a coding tree unit (CTU), a combination thereof, and/or the like. The at least one encoding parameter may comprise an in-loop filter parameter that may be adaptively determined based on the plurality of film grain parameters. For example, the content item may comprise a "heavy" amount of film grain in the original version provided by the source 102, and the QP may be increased during an encoding process of a de-noised version of the content item (or a portion thereof) as described further herein due to the fact that upon adding the film grain back at the decoder end, artifacts which have been possibly created due to encoding with the increased QP may not be visually noticeable (e.g., below a Just Noticeable Difference (JND) of the Human Visual System (HVS)).

The at least one encoding parameter may comprise a component of an encoding cost function, such as the following equation:

$$\min\{J(D,R)\}=D+\lambda*R$$

where D is an amount of distortion, R is a cost (e.g., in bits, bytes, etc.) to encode, and $\lambda$ is a Lagrangian multiplier, which may be conventionally determined in an empirical manner. The encoding cost function shown above may be used when the content item is encoded according to the HEVC compression standard (e.g., H.265). Other cost functions may be used by the encoder 104 when the content item is encoded according to other compression standards.

The encoding cost function may be minimized to select a best encoding mode during an encoding process of the content item. The encoder 104 may determine the at least one encoding parameter by determining a component of the encoding cost function for at least a portion of the content item (e.g., a segment, fragment, frame(s), etc.). For example, the encoder 104 may determine the component of the encoding cost function for at least the portion of the content item based on the plurality of film grain parameters associated with at least the portion of the content item. The portion of the content item may comprise a prediction unit (PU), a coding unit (CU), a coding tree unit (CTU), a combination thereof, and/or the like. For example, each frame of the content item may be divided into a quantity of partitions.

Figure 3A:
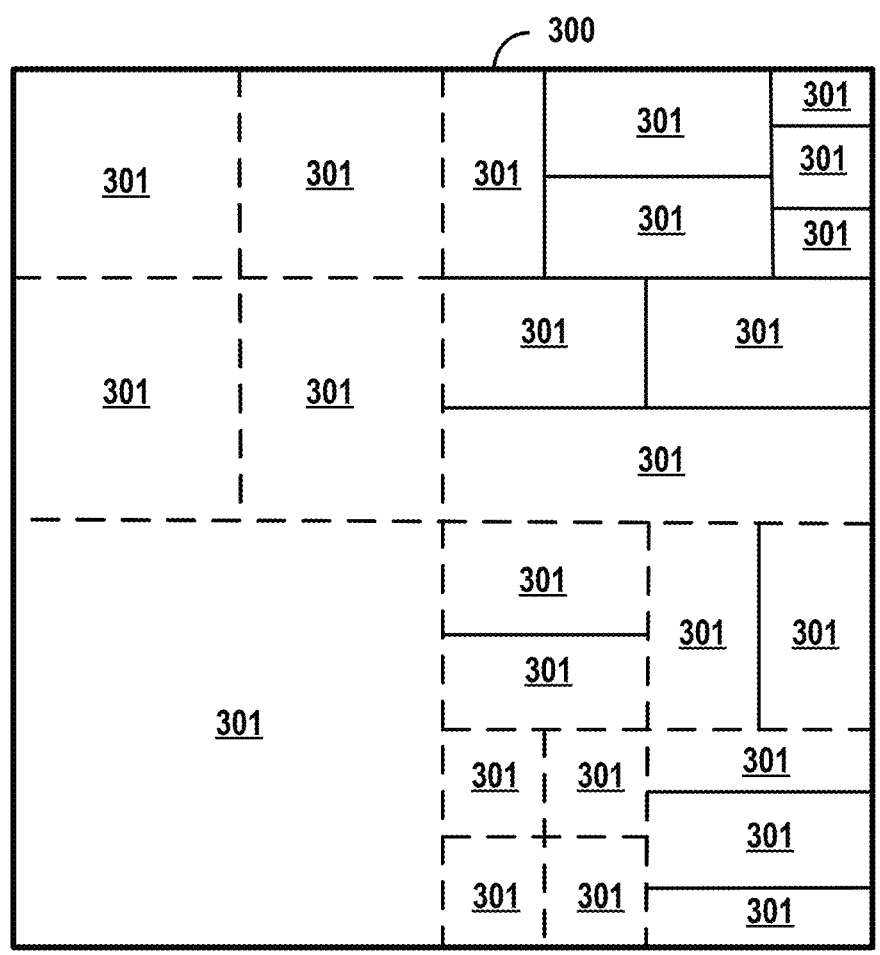
FIG. 3A shows an example coding structure of a video frame.

FIG. 3A shows an example frame 300 that has been divided into a quantity of partitions 301 (e.g., coding units) Each partition 301 may comprise a plurality of pixels. Depending on the encoding format/standard used by the encoder 104, each partition 301 may be a block, macroblock, coding tree unit, etc. A partition 301 may comprise a plurality of pixels (e.g., a block of pixels). As shown in FIG. 3A, one partition 301 may border one or more other partitions 301. That is, some partitions 301 may share a common block border.

During the encoding process, the encoder 104 may traverse each CTU of each frame (e.g., such as the frame 300) of the content item (or a portion thereof) and determine all possible intra/inter-picture prediction modes of each CU (or any other portion of the content item) when minimizing the cost function J above. The cost function J may be evaluated for all possible coding modes (e.g., including intra-picture prediction modes, inter-picture prediction modes, etc.) to determine the best coding mode. The cost function J may therefore represent a main content compression goal of the system 100 regarding coding efficiency while condensing visual data and minimizing loss in terms of objective visual quality due to the compression.

A component of the encoding cost function may comprise a Lagrangian multiplier, $\lambda$, which may be determined based on a quantization parameter (QP) (e.g., a compression parameter) associated with the content item. The Lagrangian multiplier, $\lambda$, may be a function of the QP only, and it may therefore depend on a target compression rate without considering either subjective visual quality or any perceptual aspects of the coded video.

The Lagrangian multiplier of the cost function may be adaptively determined in an optimal manner. For example, a film grain-based Lagrangian multiplier $\lambda_{FG}$ may be determined by the encoder 104 per prediction unit (PU), coding unit (CU), coding tree unit (CTU), and/or on a per group of CTUs basis—up to a size of the corresponding frame. The film grain-based Lagrangian multiplier $\lambda_{FG}$ may be defined as follows:

$$\lambda_{FG}=\lambda*Q_{FG}$$

where $\lambda$ may be the original Lagrangian multiplier from the cost function J above and $Q_{FG}$ is a quality factor that may be based on the plurality of film grain parameters. As described herein, the original Lagrangian multiplier, $\lambda$, may depend only on QP, and it therefore may be predetermined in a conventional manner (e.g., empirically). The quality factor $Q_{FG}$ may be adjusted to a Standard Dynamic Range (SDR), a High Dynamic Range (HDR), etc.

As another example, the at least one encoding parameter may comprise at least one filtering parameter. The at least one filtering parameter may comprise, for example, an in-loop filter parameter, a deblocking filter parameter, a Sample Adaptive Offset (SAO) filter parameter, or an Adaptive Loop Filter (ALF) parameter. The encoder 104 may determine the at least one filtering parameter in a variety of ways. In the case of the "heavy" film grain described above, the encoder 104 may increase a value(s) of the at least one filtering parameter to apply stronger filtering/smoothing of the content item during the encoding process in order to remove coding artifacts (e.g., due to utilizing the above-mentioned increased QP) and to further increase video coding gains despite a possible degradation in visual quality due to possible removal of fine details. Such fine details may be perceptually invisible at the user device 112 upon synthesizing and adding back the original "heavy" film gain, as described herein.

The encoder 104 may determine the at least one filtering parameter by determining a strength of a deblocking filter based on the plurality of film grain parameters. As another example, the encoder 104 may determine the at least one filtering parameter by determining a plurality of coding block borders to be filtered (e.g., within each frame or within a Group of Pictures (GOP)) based on the plurality of film grain parameters. Each coding block border of the plurality of coding block borders may comprise a vertical direction or a horizontal direction. In determining the plurality of coding block borders to be filtered, the encoder 104 may determine a quantity and/or a direction of coding block borders to be filtered. When encoding the content item according to the HEVC and/or the VVC video coding standards, the strength of a deblocking filter determined by the encoder 104 may be substantially based on the corresponding QP value(s), since picture-blocking is mainly a consequence of block transforms and quantization inherent to HEVC and VVC.

In video coding applications that use block-based prediction and transform coding (e.g., H.265/MPEG-HEVC), some blocking artifacts—which may be referred to herein as "blockiness"—may appear at block boundaries. This may occur when there is no correlation between blocks (e.g., coding blocks) and discontinuities on block edges. Such blocking artifacts may be perceptible by the HVS, for example, when the content item comprises relatively smooth (e.g., flat) content/video. Perceptible blocking artifacts may be due to applying block-transform coding on a prediction error and then performing coarse quantization (e.g., with a relatively high quantization parameter (QP)). In order to reduce blockiness, the encoder 104 may perform at least one in-loop filtering operation (e.g., a deblocking filtering operation), in which a deblocking filter may be applied to a reconstructed picture in order to improve objective as well as subjective picture quality and for enhancing continuity of block boundaries (e.g., borders/edges). In addition, since a filtered frame may be used as a reference for motion-compensated prediction of future frames, corresponding coding efficiency may be increased, thereby leading to bit-rate savings.

Figure 3B:
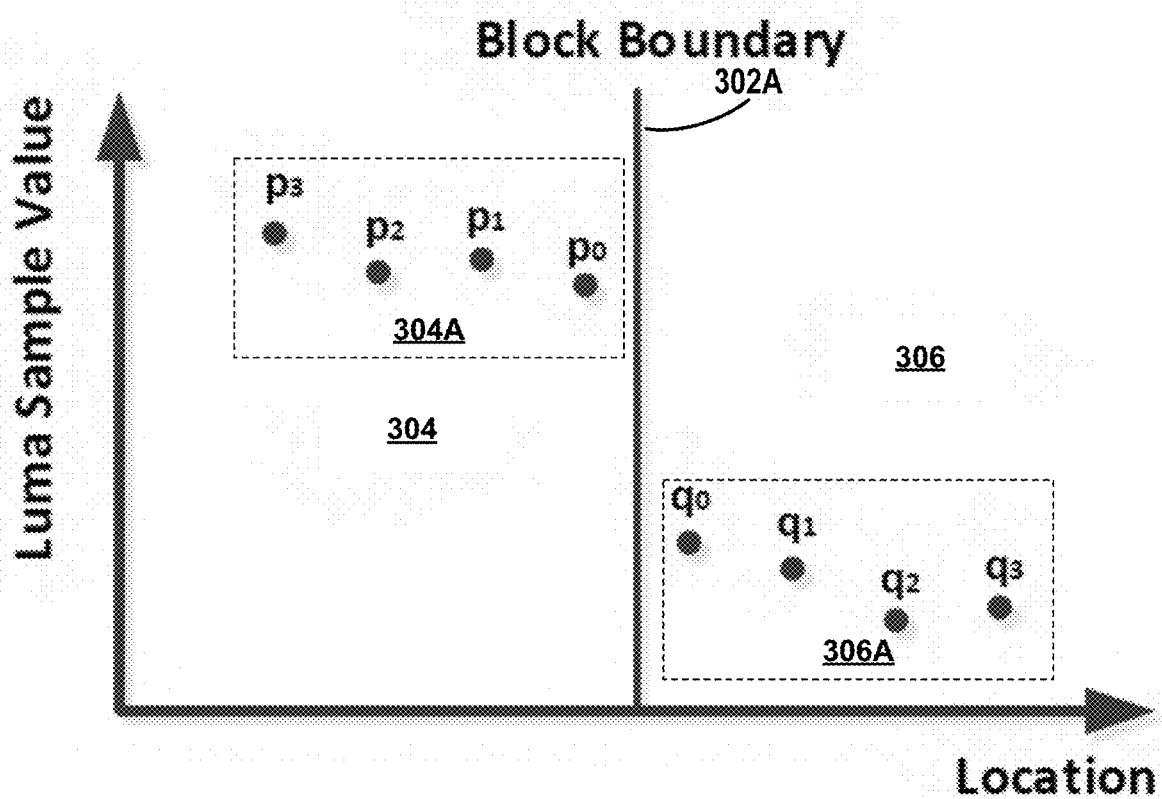
FIG. 3B shows an example chart.

FIG. 3B shows an example chart 302 depicting a block boundary 302A between a first block 304 and a second block 306 with possible blocking artifacts. The block boundary 302A shown in FIG. 3B may be one of the plurality of coding block borders described above. The first block 304 may comprise a first plurality of pixels 304A, and the second block 306 may comprise a second plurality of pixels 306A. There may be a variation in pixel values ("Luma Sample Values") between the pixels in the first block 304 and the second block 306. For example, as shown in FIG. 3B, the first plurality of pixels 304A (e.g., pixels p0; p1; p2; p3) may each comprise a higher luma sample value as compared to the second plurality of pixels 306A (e.g., pixels q0; q1; q2; q3). The block boundary 302A may contain blocking artifacts due to the difference in luma sample values between the first plurality of pixels 304A and the second plurality of pixels 306A. The blocking artifacts may be characterized by relatively low spatial activity on two opposite sides of the block boundary 302A, and there may be a discontinuity at the block boundary 302A itself. These blocking artifacts may have a large impact on overall picture quality, and they may be reduced or removed by the encoder 104 using the at least one filtering parameter described herein.

The encoder 104 may determine the at least one filtering parameter by determining a first threshold parameter (e.g., a β parameter) and second threshold parameter. (e.g., a tC parameter). The first threshold parameter and the second threshold parameter may be determined based on a QP associated with at least two neighboring blocks (e.g., partitions 301) of at least one frame of the content item. For example, the first threshold parameter and the second threshold parameter may be dependent on an average QP value associated with at least two neighboring blocks (e.g., partitions 301) having a common block border (e.g., boundary).

The at least one in-loop filtering operation (e.g., a deblocking filtering operation) may be applied to a grid of 8×8 pixels. As a result, the at least one in-loop filtering operation may allow the encoder 104 to significantly reduce computational complexity. The filtering decisions may be made by the encoder 104 for each boundary of a four-sample block positioned on a grid splitting the picture on 8×8 samples, and boundaries of a prediction or transform unit may be taken into consideration by the encoder 104 when determining the at least one filtering parameter and/or when performing the at least one in-loop filtering operation. For example, the encoder 104 may determine a quantity of block borders (e.g., boundaries) to be filtered based on the first threshold parameter.

Figure 3C:
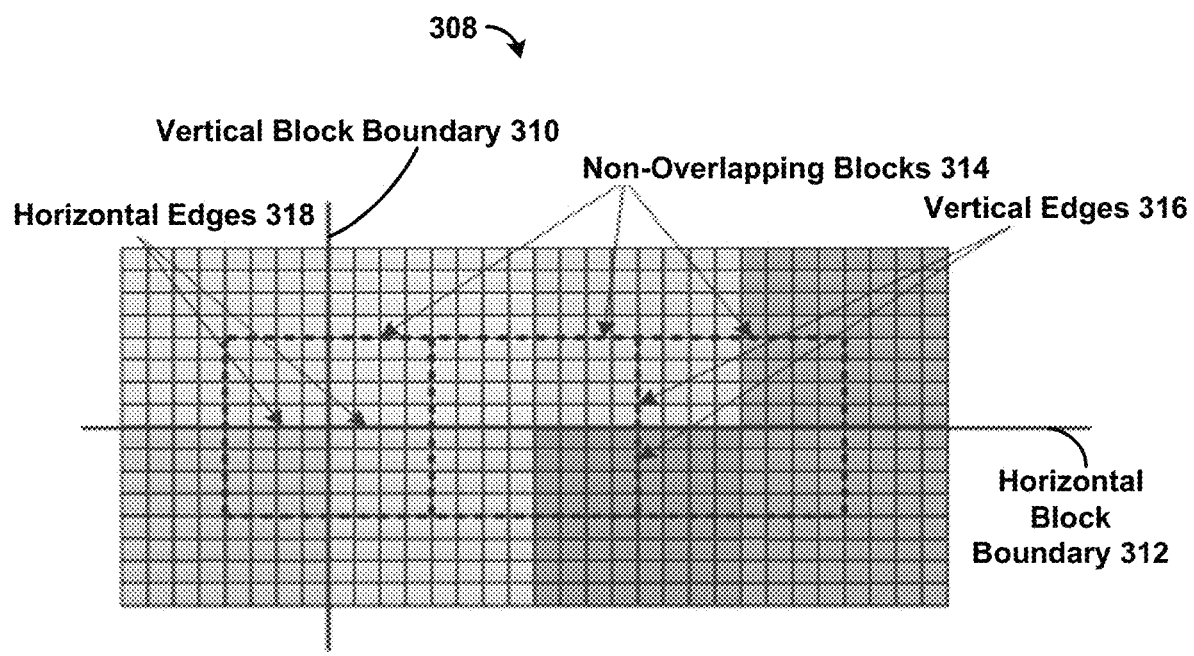
FIG. 3C shows an example grid.

FIG. 3C shows an example grid 308 splitting a picture (e.g., a frame of a content item) on 8×8 pixel samples as described herein. The grid 308 may comprise a plurality of non-overlapping blocks 314 (e.g., non-overlapping 8×8 pixel blocks). Each of the non-overlapping blocks 314 may be deblocked/filtered in parallel (e.g., according to/based on the first threshold parameter described herein). As described herein, each coding block border (e.g., boundary) of the plurality of coding block borders may comprise a vertical direction or a horizontal direction. FIG. 3C shows example vertical edges 316 (e.g., coding block borders/boundaries in a vertical direction) and example horizontal edges 318 (e.g., coding block borders/boundaries in a horizontal direction). The encoder 104 may determine the quantity of block borders (e.g., boundaries), such as those shown in FIG. 3C, to be filtered based on the first threshold parameter described herein. For example, the plurality of coding block borders described herein, which may be deblocked/filtered by the encoder 104 according to the at least one filtering parameter and/or the at least one in-loop filtering operation, may each comprise a vertical edge 316 or a horizontal edge 318. That is, each coding block border of the plurality of coding block borders described herein may be associated with one or more non-overlapping blocks, such as one or more of the non-overlapping blocks 314, that may each be deblocked/filtered according to the at least one filtering parameter and/or the at least one in-loop filtering operation described herein.

The encoder 104 may determine a strength of a deblocking filter based on the second threshold parameter. The strength of the deblocking filter may be used to determine a plurality of pixels of the at least one frame of the content item (or portion thereof, such as a partition 301) to be modified. The plurality of pixels may be associated with a common block border of the at least two neighboring blocks (e.g., partitions 301). The encoder 104 may determine a maximum quantity of modifications for each pixel of the plurality of pixels. For example, the encoder 104 may determine the maximum quantity of modifications based on the strength of the deblocking filter and the quantization parameter (e.g., a maximum absolute value of modifications that are allowed for corresponding pixel values for a particular QP). Determining the maximum quantity of modifications based on the strength of the deblocking filter and the quantization parameter may limit an amount of blurriness introduced by the deblocking filter.

Figure 3D:
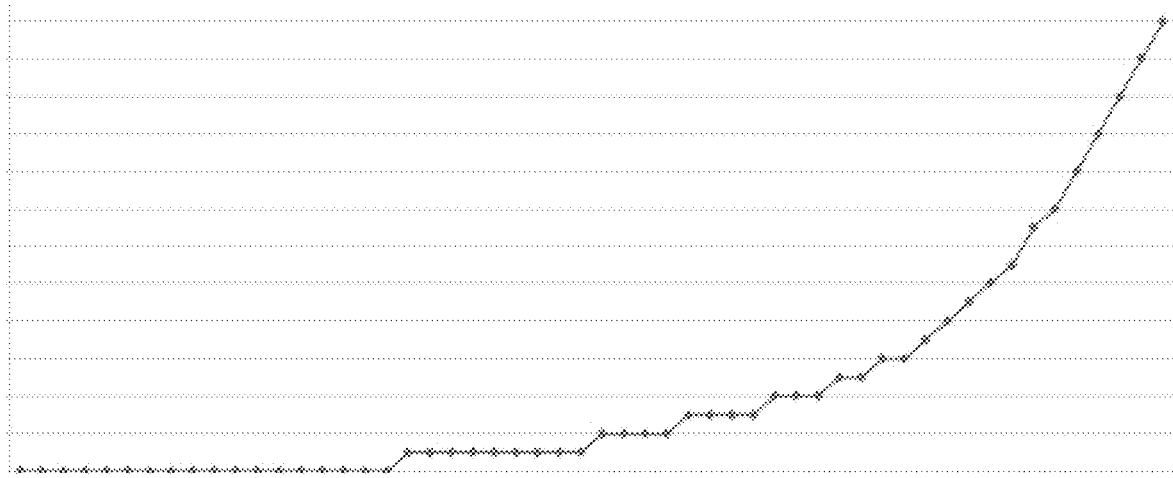
FIG. 3D shows an example graph.

FIG. 3D shows an example graph 320A of values of the second threshold parameter (e.g., tC) as a function of QP. As shown in FIG. 3D, the values of the second threshold parameter may increase as the QP increases, which may allow and/or cause the encoder 104 to perform the at least one in-loop operation (e.g., a deblocking operation(s)) more often based on larger QP values. As another example, when the QP values are low, values for both the first threshold parameter (e.g., β) and the second threshold parameter (e.g., tC) may be 0, thereby disabling the at least one in-loop filtering operation (e.g., the deblocking operation) and reducing computational resources.

Figure 3E:
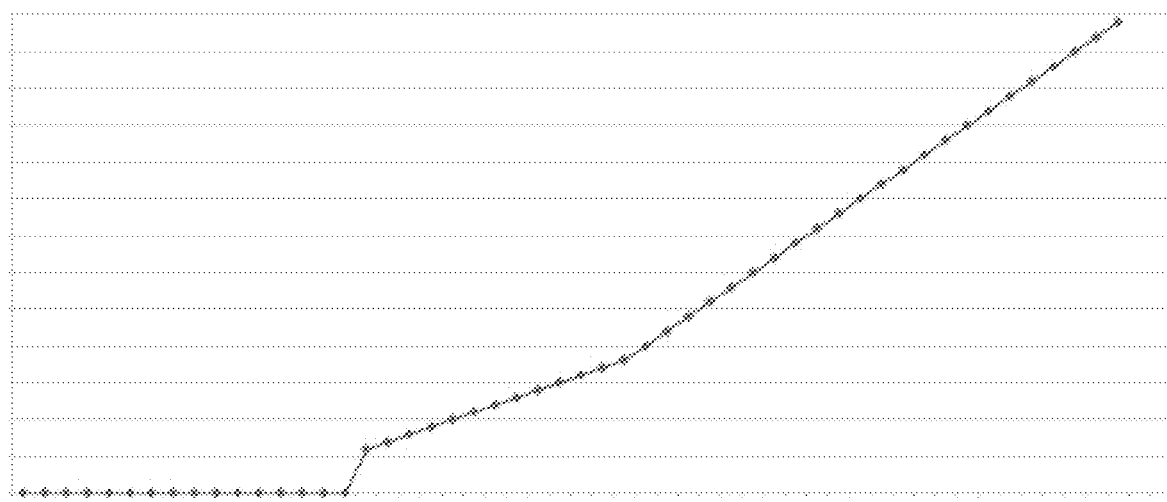
FIG. 3E shows an example graph.

FIG. 3E shows an example graph 320B of values of the first threshold parameter (e.g., β) as a function of QP. As shown in FIG. 3E, the values of the first threshold parameter may increase as the QP increases. As described herein, the values of the first threshold parameter may determine which block boundaries/borders are modified by the at least one in-loop filtering operation (e.g., the deblocking operation). As seen in FIGS. 3D and 3E, a higher QP value generally leads to higher values for the first threshold parameter and the second threshold parameter, which may lead to, for example, a higher frequency of occurrence of (e.g., performance of) the at least one in-loop filtering operation and/or a higher number of samples from block boundaries being modified (e.g., depending on a strength of the filtering applied/performed).

The encoder 104 may adaptively determine an offset for the first threshold parameter and an offset for the second threshold parameter based on the plurality of film grain parameters and the quantization parameter. For example, the encoder 104 may adjust a quantization parameter, and the adjustment to the quantization parameter may be used to determine the offset for the first threshold parameter and the offset for the second threshold parameter. As a result, some small non-perceptible details may be removed from the coded blocks (e.g., partitions 301), thereby leading to larger coding gains and further reducing computational complexity for the overall encoding process (e.g., resulting in less CTU/CU splits and less motion vectors (MVs) that may be required to encode the content item/portion thereof).

The encoder 104 may encode a portion—or the entirety—of the content item. The encoder 104 may encode the content item based on the at least one encoding parameter and/or the at least one filtering parameter described herein. For example, the encoder 104 may determine a de-noised version of a portion—or the entirety—of the content item based on the plurality of film grain parameters. The de-noised version may lack the film grain noise present in the pre-encoded version of the portion—or the entirety—of the content item. The encoder 104 may encode the de-noised version of the portion—or the entirety—of the content item.

The encoder 104 may determine/generate an encoding message. For example, the encoder 104 may determine/generate the encoding message based on the at least one encoding parameter and/or the at least one filtering parameter. The encoding message may comprise a Supplemental Enhancement Information (SEI) message. The encoding message may be indicative of the at least one encoding parameter and/or the at least one filtering parameter. The encoding message may comprise additional information as well to allow the content item to be decoded. The encoder 104 may send the encoding message. For example the encoder 104 may send the encoding message to user device 112. As another example, the encoder 104 may send the encoding message to the packager 106, which may in turn send the encoding message to the user device 112. As a further example, the encoder 104 may send the encoding message to the content server 108, which may in turn send the encoding message to the user device 112. The encoding message may cause the user device 112 to decode the content item (e.g., the encoded de-noised version of the portion—or the entirety—of the content item). For example, the user device 112 may use the encoding message to synthesize the film grain noise that was present in the pre-encoded version of the content item based on the at least one encoding parameter and/or the at least one filtering parameter. In this way, the encoding message may be used to decode the content item and preserve the visual appearance of the content item (e.g., with the film grain noise).

As described herein, the system 100 may be used to adaptively process an entire content item (e.g., an entire video) or a portion of a content item (e.g., a frame, segment, fragment, etc.). For example, an entire content item may be adaptively processed to remove noise present within any portion of the content item by determining a plurality of film grain parameters associated with the content item as a whole. As another example, a portion of a content item, such as a frame, a segment, a fragment, etc., may be adaptively processed to remove noise present within that portion by determining a plurality of film grain parameters associated with that portion of the content item. Other examples are possible as well. It is to be understood that the system 100 may be used to adaptively process as much—or as little—of a content item that is desired and/or required.

The one or more machine learning techniques described herein may be implemented by a machine learning module. The machine learning module may comprise a device, a network of devices, a component of a device, a combination thereof, and/or the like. The machine learning module may be resident at any of the devices shown in the system 100. Additionally, or in the alternative, the machine learning module may be resident at another device(s) that is in communication with one or more of the devices shown in the system 100 (not shown in FIG. 1). The machine learning module may determine (e.g., identify, detect, etc.) film grain and/or film grain parameters in video frames using at least one filter, as further described herein. The at least one filter may be considered as a "sliding window" that views/analyzes a video frame one portion at a time.

Figure 4:
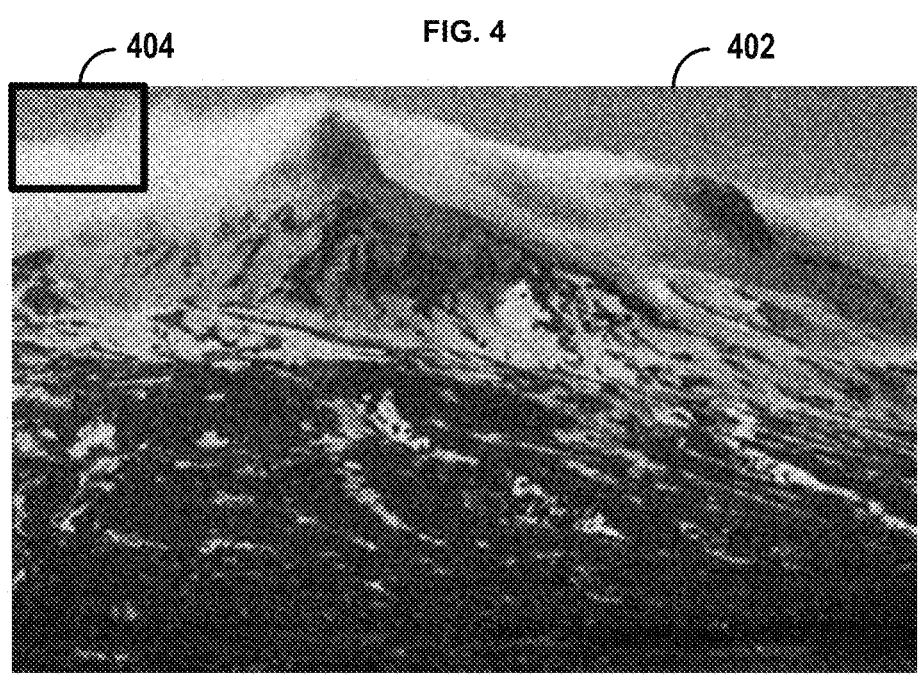
FIG. 4 shows an example video frame.

FIG. 4 shows an example video frame 402 and a sliding window 404 (e.g., the at least one filter). The machine learning module may use the sliding window 404 to traverse the video frame 402 and determine (e.g., identify, detect, etc.) one or more portions of the video frame 402 having film grain and/or features indicative of the plurality of film grain parameters described herein. For example, the machine learning module may analyze the video frame 402 using the sliding window 404 and one or more segmentation algorithms/techniques to detect the one or more portions of the video frame 402 having film grain and/or features indicative of the plurality of film grain parameters described herein.

The machine learning module may analyze a portion of the video frame 402 within a current position of the sliding window 404. The sliding window 404 may start at a corner (or any other area) of the video frame 402 and output an indication of film grain and/or features indicative of the plurality of film grain parameters described herein within that current region of the video frame 402. For example, the machine learning module may determine that the current region of the video frame 402 (e.g., within the sliding window 404) is indicative of a film grain pattern, a film grain size, a film grain density, a film grain color, a film grain intensity, a combination thereof, and/or the like. The sliding window 404 may "loop" or "traverse" each portion of the video frame 402 and indicate regions having film grain and/or features indicative of the plurality of film grain parameters described herein. The machine learning module may Turning now to FIG. 5, a system 500 for training a machine learning module 530 is shown. The machine learning module 530 may comprise the machine learning module. The machine learning module 530 may be trained by a training module 520 of the system 500 to determine (e.g., identify, detect, etc.) one or more portions of video frames having film grain and/or features indicative of the plurality of film grain parameters described herein. The training module 520 may use machine learning ("ML") techniques to train, based on an analysis of one or more training datasets 510, the ML module 530.

Figure 5:
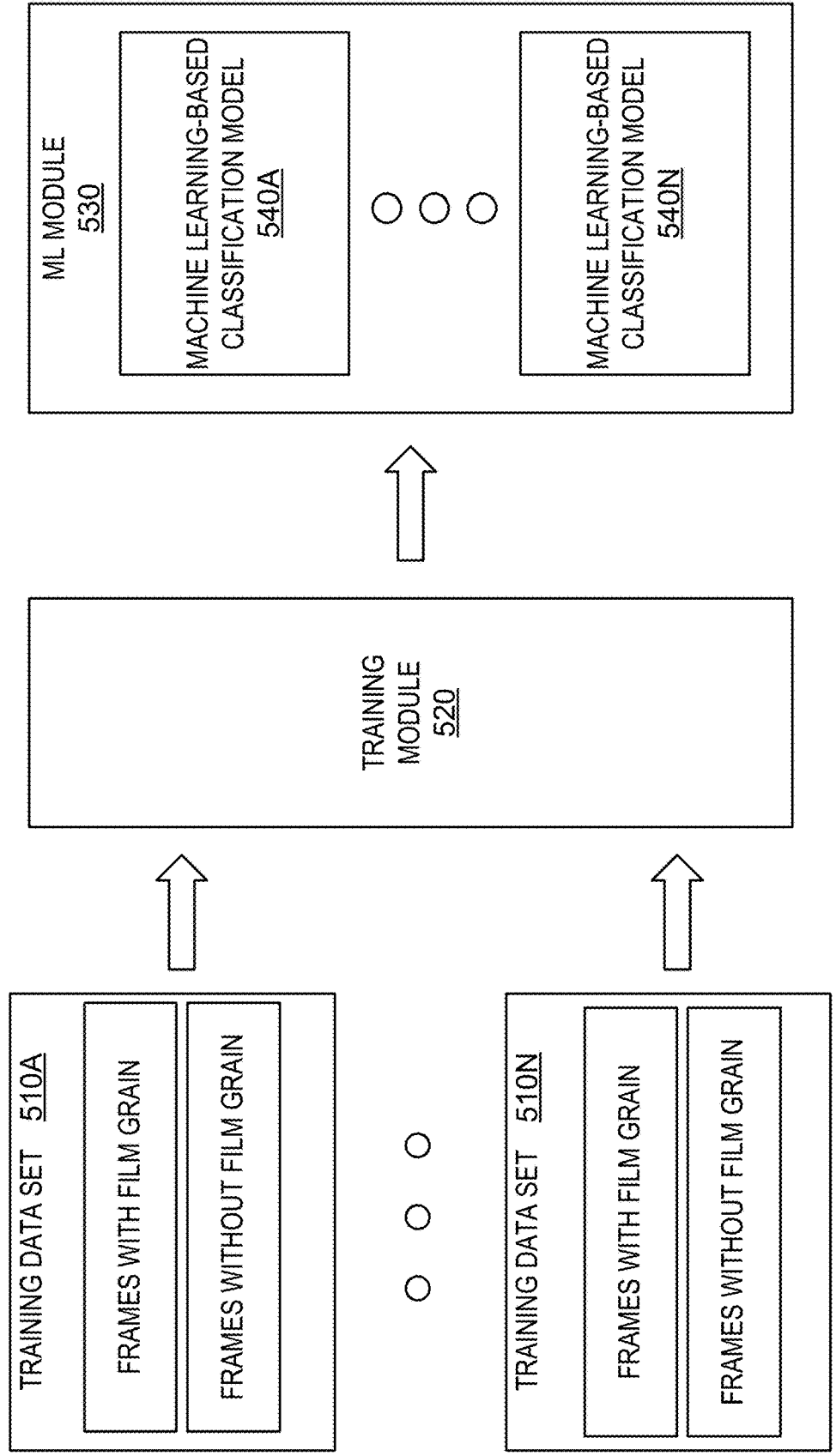
FIG. 5 shows an example system.

The training datasets 510 may comprise any number of datasets or subsets 510A-510N. For example, the training datasets 510 may comprise a first training dataset 510A and a second training dataset 510B. The first training dataset 510A may comprise a first plurality of video frames. As shown in FIG. 5, the first training dataset 510A may comprise a first plurality of video frames, which itself may comprise some video frames with film grain and other video frames without film grain. The second training dataset 510B may comprise a second plurality of video frames, which itself may comprise some video frames with film grain and other video frames without film grain. In some examples, the first plurality of video frames may be indicative of a first subset of the plurality of film grain parameters described herein, while the second plurality of video frames may be indicative of a second subset of the plurality of film grain parameters described herein.

A subset of one or both of the first training dataset 510B or the second training dataset 510B may be randomly assigned to a testing dataset. In some implementations, the assignment to a testing dataset may not be completely random. In this case, one or more criteria may be used during the assignment. In general, any suitable method may be used to assign data to the testing dataset, while ensuring that the distributions of video frames indicative of the plurality of film grain parameters are properly assigned for training and testing purposes.

The training module 520 may train the ML module 530 by extracting a feature set from the video frames in the training datasets 510 according to one or more feature selection techniques. For example, the training module 520 may train the ML module 530 by extracting a feature set from the training datasets 510 that includes statistically significant features. The training module 520 may extract a feature set from the training datasets 510 in a variety of ways. The training module 520 may perform feature extraction multiple times, each time using a different feature-extraction technique. In an example, the feature sets generated using the different techniques may each be used to generate different machine learning-based classification models 540A-540N. For example, the feature set with the highest quality metrics may be selected for use in training. The training module 520 may use the feature set(s) to build one or more machine learning-based classification models 540A-540N that are configured to determine (e.g., identify, detect, etc.) one or more portions of a video frame(s) having film grain and/or features indicative of the plurality of film grain parameters described herein. The one or more machine learning techniques described herein and/or the machine learning module described herein may use and/or comprise any of the machine learning-based classification models 540A-540N.

The training datasets 510 may be analyzed to determine any dependencies, associations, and/or correlations between determined features in unlabeled video frames (e.g., those not indicating certain film grain parameters) and the features of labeled video frames in the training dataset 510. The identified correlations may have the form of a list of features. The term "feature," as used herein, may refer to any characteristic of an item of data that may be used to determine whether the item of data falls within one or more specific categories (e.g., film grain parameter A vs. film grain parameter B, etc.). A feature selection technique may comprise one or more feature selection rules. The one or more feature selection rules may comprise a feature occurrence rule. The feature occurrence rule may comprise determining which features in the training dataset 510 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training datasets 510 to generate a first list of features. A final list of features may be analyzed according to additional feature selection techniques to determine one or more feature groups (e.g., groups of features that may be used to identify one or more of the plurality of film grain parameters). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable.

As another example, one or more feature groups may be selected according to a wrapper method. A wrapper method may be configured to use a subset of features and train the ML module 530 using the subset of features. Based on the inferences that drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more feature groups. Forward feature selection is an iterative method that begins with no feature in the corresponding machine learning model. In each iteration, the feature which best improves the model is added until an addition of a new variable does not improve the performance of the machine learning model. As an example, backward elimination may be used to identify one or more feature groups.

Backward elimination is an iterative method that begins with all features in the machine learning model. In each iteration, the least significant feature is removed until no improvement is observed on removal of features. Recursive feature elimination may be used to identify one or more feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 520 has generated a feature set(s), the training module 520 may generate the machine learning-based classification models 540A-540N based on the feature set(s). A machine learning-based classification model may refer to a complex mathematical model for data classification that is generated using machine-learning techniques. In one example, the machine learning-based classification models 540A-540N may each include a map of support vectors that represent boundary features. By way of example, boundary features may be selected from, and/or represent the highest-ranked features in, a feature set. The training module 520 may use the feature sets determined or extracted from the training dataset 510 to build the machine learning-based classification models 540A-540N. In some examples, the machine learning-based classification models 540A-540N may be combined into a single machine learning-based classification model 540. Similarly, the ML module 530 may represent a single classifier containing a single or a plurality of machine learning-based classification models 540 and/or multiple classifiers containing a single or a plurality of machine learning-based classification models 540.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 530 may comprise a decision rule or a mapping for each feature of each video frame in the training datasets 510 that may be used to detect one or more of the plurality of film grain parameters in other video frames. In an embodiment, the training module 520 may train the machine learning-based classification models 540 as a neural network, which is further described herein with respect to FIG. 7.

The feature(s) and the ML module 530 may be used to determine one or more portions of video frames in the testing data set indicative of one or more of the plurality of film grain parameters. In one example, the prediction/result for each detected/portion of the video frames includes a confidence level that corresponds to a likelihood or a probability that each feature derived is associated with a particular parameter(s) of the plurality of film grain parameters. The confidence level may be a value between zero and one. In one example, when there are two statuses (e.g., film grain parameter A vs. film grain parameter B, etc.), the confidence level may correspond to a value p, which refers to a likelihood that a particular portion of a video frame is indeed indicative of the particular parameter(s) of the plurality of film grain parameters. In this case, the value 1-p may refer to a likelihood that the particular parameter(s) belongs to the second status (e.g., not actually indicative of that parameter(s)). In general, multiple confidence levels may be provided for each parameter(s) of the plurality of film grain parameters in the testing data set and for each feature when there are more than two statuses.

Figure 6:
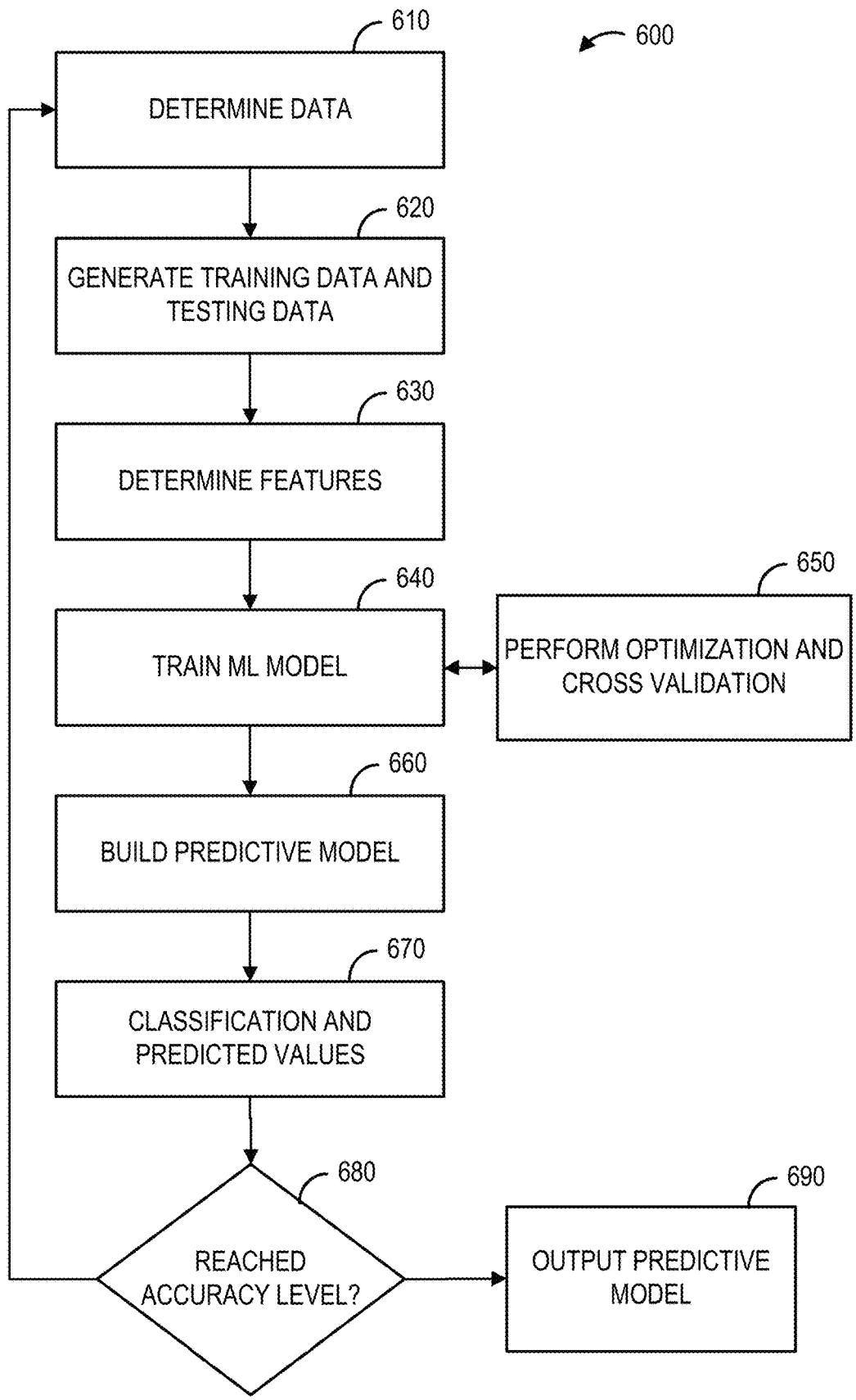
FIG. 6 shows an example training workflow.

FIG. 6 is a flowchart illustrating an example training method 600 for generating the ML module 530 using the training module 520. The training module 520 can implement supervised, unsupervised, and/or semi-supervised (e.g., reinforcement based) machine learning-based classification models 540. The method 600 illustrated in FIG. 6 is an example of a supervised learning method; variations of this example of training method are discussed below, however, other training methods can be analogously implemented to train unsupervised and/or semi-supervised machine learning models. The training method 600 may determine (e.g., access, receive, retrieve, etc.) data at step 610. The data may comprise video frames indicative of the plurality of film grain parameters described herein.

The training method 600 may generate, at step 620, a training dataset and a testing data set. The training dataset and the testing data set may be generated by randomly assigning video frames (or a portion(s) thereof) to either the training dataset or the testing data set. In some implementations, the assignment of video frames (or a portion(s) thereof) as training or testing data may not be completely random. As an example, a majority of the video frames (or a portion(s) thereof) may be used to generate the training dataset. For example, 75% of the video frames (or a portion(s) thereof) may be used to generate the training dataset and 25% may be used to generate the testing data set. In another example, 80% of the video frames (or a portion(s) thereof) may be used to generate the training dataset and 20% may be used to generate the testing data set.

The training method 600 may determine (e.g., extract, select, etc.), at step 630, one or more features that can be used by, for example, a classifier to differentiate among different parameter(s) of the plurality of film grain parameters. As an example, the training method 600 may determine a set of features from the video frames (or a portion(s) thereof). In a further example, a set of features may be determined from data that is different than the video frames (or a portion(s) thereof) in either the training dataset or the testing data set. Such video frames (or a portion(s) thereof) may be used to determine an initial set of features, which may be further reduced using the training dataset.

The training method 600 may train one or more machine learning models using the one or more features at step 640. In one example, the machine learning models may be trained using supervised learning. In another example, other machine learning techniques may be employed, including unsupervised learning and semi-supervised. The machine learning models trained at 640 may be selected based on different criteria depending on the problem to be solved and/or data available in the training dataset. For example, machine learning classifiers can suffer from different degrees of bias. Accordingly, more than one machine learning model can be trained at 640, optimized, improved, and cross-validated at step 650.

The training method 600 may select one or more machine learning models to build a predictive model at 660. The predictive model may be evaluated using the testing data set. The predictive model may analyze the testing data set and indicate one or more parameters of the plurality of film grain parameters present in the video frames (or a portion(s) thereof) at step 660. The video frames (or a portion(s) thereof) indicative of the one or more parameters may be evaluated at step 680 to determine whether a desired accuracy level has been met. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified a portion(s) of a video frame as being indicative of a particular parameter(s) of the plurality of film grain parameters when in reality is was not. Conversely, the false negatives of the predictive model may refer to a number of times the machine learning model classified a portion(s) of a video frame as not being indicative of a particular parameter(s) of the plurality of film grain parameters when, in fact, the portion(s) is indeed indicative of that particular parameter(s). True negatives and true positives may refer to a number of times the predictive model correctly classified a portion(s) of a video frame as being indicative or not indicative (as the case may be) of a particular parameter(s) of the plurality of film grain parameters. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 530) may be output at step 690. When the desired accuracy level is not reached, then a subsequent iteration of the training method 600 may be performed starting at step 610 with variations such as, for example, considering a larger collection of video frames.

Figure 7:
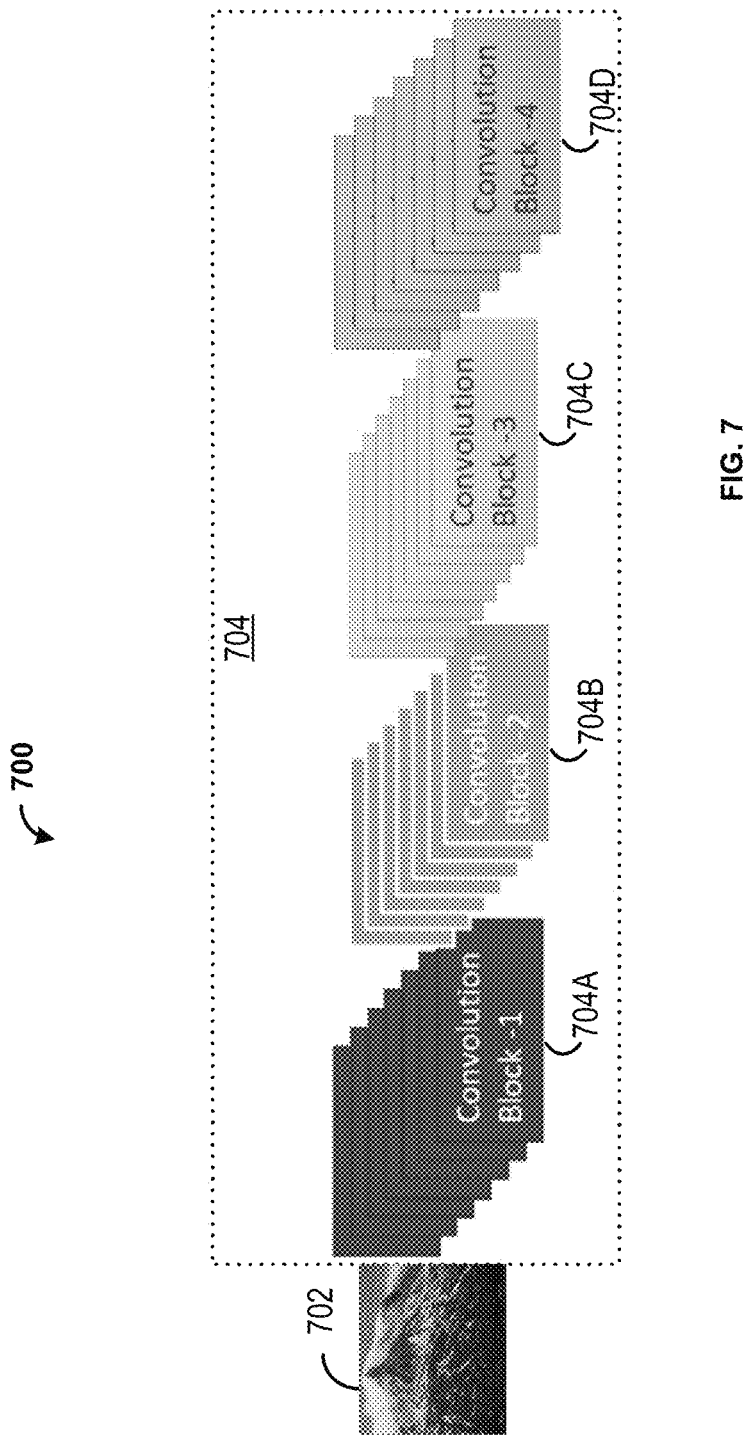
FIG. 7 shows an example neural network.

As described herein, the training module 520 may train the machine learning-based classification models 540, which may comprise a convolutional neural network (CNN). FIG. 7 shows an example neural network architecture 700 of the CNN. Each of the machine learning-based classification models 640 may comprise a deep-learning model comprising one or more portions of the neural network architecture 700. The neural network architecture 700 may perform feature extraction, as described herein, on a plurality of video frames using a set of convolutional operations, which may comprise a series of filters that are used to filter each image. The neural network architecture 700 may perform of a number of convolutional operations (e.g., feature extraction operations). The components of the neural network architecture 700 shown in FIG. 7 are meant to be exemplary only. The neural network architecture 700 may include additional components and/or layers other than those shown in FIG. 7, as one skilled in the art may appreciate.

The neural network architecture 700 may comprise a plurality of blocks 704A-704D that may each comprise a number of operations performed on an input video frame 702 (e.g., an video frame as described above). The operations performed on the input video frame 702 may include, for example, a Convolution2D (Conv2D) or SeparableConvolution2D operation followed by zero or more operations (e.g., Pooling, Dropout, Activation, Normalization, BatchNormalization, other operations, or a combination thereof), until another convolutional layer, a Dropout operation, a Flatten Operation, a Dense layer, or an output of the neural network architecture 700 is reached.

A Dense layer may comprise a group of operations or layers starting with a Dense operation (e.g., a fully connected layer) followed by zero or more operations (e.g., Pooling, Dropout, Activation, Normalization, BatchNormalization, other operations, or a combination thereof) until another convolution layer, another Dense layer, or the output of the network is reached. A boundary between feature extraction based on convolutional layers and a feature classification using Dense operations may be indicated by a Flatten operation, which may "flatten" a multidimensional matrix generated using feature extraction techniques into a vector.

The neural network architecture 700 may comprise a plurality of hidden layers, ranging from as few as one hidden layer up to four hidden layers. One or more of the plurality of hidden layers may comprise the at least one filter described herein with respect to FIG. 4 (e.g., the sliding window 404). The at least one filter may be applied to the input video frame 702. In some examples, the input video frame 702 may be preprocessed prior to being provided to the neural network architecture 700. For example, the input video frame 702 may be resized to a uniform size. Other examples are possible as well. The at least one filter may be applied to the resized input video frame 702.

The neural network architecture 700 may comprise a plurality of hyperparameters and at least one activation function at each block of the plurality of blocks 704A-704D. The plurality of hyperparameters may comprise, for example, a batch size, a dropout rate, a number of epochs, a dropout rate, strides, paddings, etc. The at least one activation function may comprise, for example, a rectified linear units activation function, a hyperbolic tangent activation function, etc.

At each block of the plurality of blocks 704A-704D, the input video frame 702 may be processed according to a particular kernel size (e.g., a number of pixels). For example, the first block 704A may comprise a number of convolution filters, a kernel size, and an activation function. The input video frame 702 may then pass to the second block 704B, which may comprise a number of convolution filters, a kernel size, and an activation function. The input video frame 702 may then pass to the third block 704C, which may comprise a BatchNormalization operation. The BatchNormalization operation may standardize the input video frame 702 as it is passed to through each block, which may accelerate training of the neural network architecture 700 and reduce generalization errors. For example, at the third block 704C, the input video frame 702 may pass through a Dropout layer that may apply a rate of dropout (e.g., 0.15) to prevent overfitting.

In some examples, the network architecture 700 may comprise a Flatten layer and/or a Dense layer that may receive output features that are determined as a result of passing the input video frame 702 through the plurality of blocks 704A-704D of the network architecture 700. The output features may comprise a plurality of features indicative of one or more of the plurality of film grain parameters described herein that are derived from the input video frame 702 and/or from training the network architecture 700. The Flatten layer may determine/generate an N-dimensional array based on the output features. The array may be passed to a final layer(s) of the neural network architecture 700. For example, the array may then be passed through one or more Dense layers and/or a second Dropout layer at the block 704D.

The input video frame 702 may be passed through a number of convolution filters at each block of the plurality of blocks 704A-704D, and an output may then be provided. The output may comprise an indication of one or more portions of the input video frame 702 indicative of one or more parameters of the plurality of film grain parameters described herein.

Figure 8:
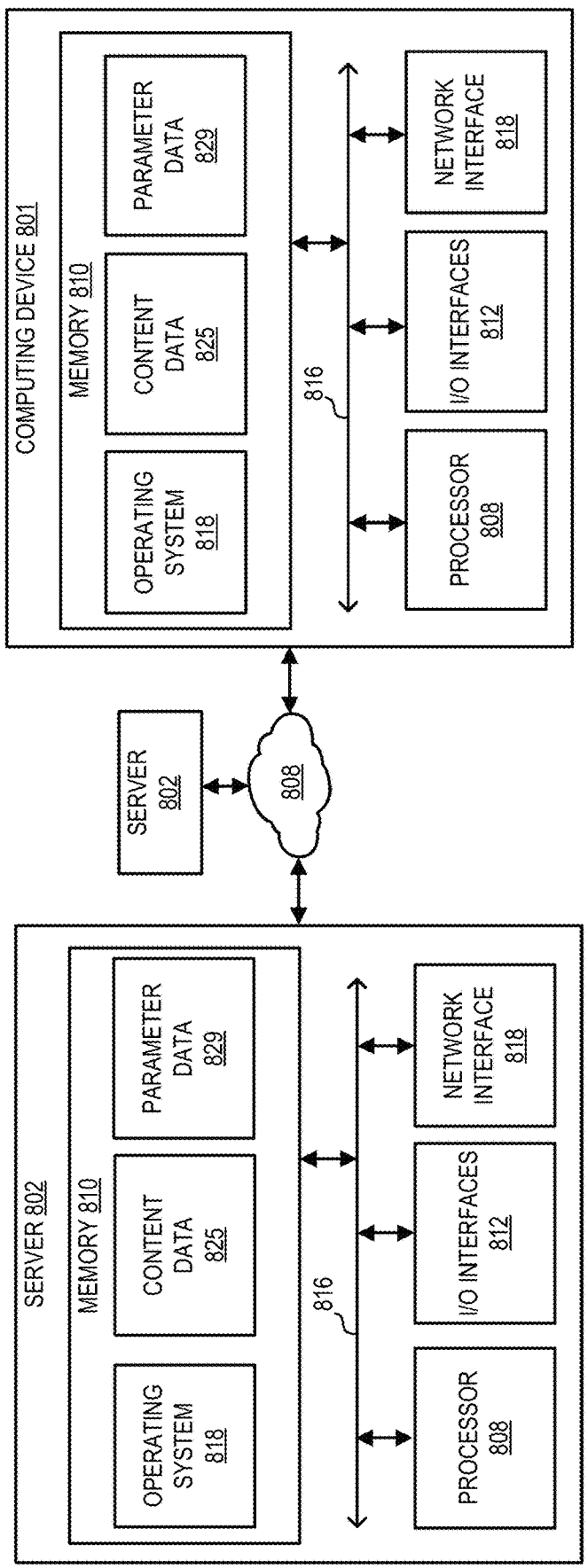
FIG. 8 shows an example system.

The present methods and systems may be computer-implemented. FIG. 8 shows a block diagram depicting a system/environment 800 comprising non-limiting examples of a computing device 801 and a server 802 connected through a network 808. Either of the computing device 801 or the server 802 may be a computing device, such as any of the devices of the system 100 shown in FIG. 1. In an aspect, some or all steps of any described method may be performed on a computing device as described herein. The computing device 801 may comprise one or multiple computers configured to store parameter data 829 (e.g., encoding parameters, film grain parameters/characteristics, and/or filtering parameters, as described herein, etc.), and/or the like. The server 802 may comprise one or multiple computers configured to store content data 828 (e.g., a plurality of content segments). Multiple servers 802 may communicate with the computing device 801 via the through the network 808.

The computing device 801 and the server 802 may be a computer that, in terms of hardware architecture, generally includes a processor 808, system memory 810, input/output (I/O) interfaces 812, and network interfaces 818. These components (808, 810, 812, and 818) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in system memory 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/or the server 802 is in operation, the processor 808 may execute software stored within the system memory 810, to communicate data to and from the system memory 810, and to generally control operations of the computing device 801 and the server 802 pursuant to the software.

The I/O interfaces 812 may be used to receive user input from, and/or for providing system output to, one or more devices or components. User input may be provided via, for example, a keyboard and/or a mouse. System output may be provided via a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 818 may be used to transmit and receive from the computing device 801 and/or the server 802 on the network 808. The network interface 818 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 818 may include address, control, and/or data connections to enable appropriate communications on the network 808.

The system memory 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 810 may incorporate electronic, magnetic, optical, and/or other types of storage media. Note that the system memory 810 may have a distributed architecture, where various components are situated remote from one another, but may be accessed by the processor 808.

The software in system memory 810 may include one or more software programs, each of which comprises an ordered listing of executable instructions for implementing logical functions. In the example of FIG. 8, the software in the system memory 810 of the computing device 801 may comprise the parameter data 829, the content data 828, and a suitable operating system (O/S) 818. In the example of FIG. 8, the software in the system memory 810 of the server 802 may comprise the parameter data 829, the content data 828, and a suitable operating system (O/S) 818. The operating system 818 essentially controls the execution of other computer programs and provides scheduling, input-output control, file and data management, memory management, and communication control and related services.

For purposes of illustration, application programs and other executable program components such as the operating system 818 are shown herein as discrete blocks, although it is recognized that such programs and components may reside at various times in different storage components of the computing device 801 and/or the server 802. An implementation of the system/environment 800 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

FIG. 9 shows a flowchart of an example method 900 for adaptive processing of video content with noise, such as film grain noise. The method 900 may be performed in whole or in part by a single computing device, a plurality of computing devices, and the like. For example, the steps of the method 900 may be performed by the encoder 104, the packager 106, the content server 108, or the user device 112 shown in FIG. 1 and/or a computing device in communication with any of the aforementioned devices/entities. Some steps of the method 900 may be performed by a first computing device (e.g., the encoder 104), while other steps of the method 900 may be performed by a second computing device (e.g., the user device 112). For example, the first computing device (e.g., the encoder 104) may process and/or encode a content item, and the second computing device (e.g., the user device 112) may decode and/or output the content item.

At step 910, a computing device, such as the encoder 104, may determine a plurality of film grain parameters associated with a content item. The plurality of film grain parameters may be associated with film grain noise present within one or more frames of the content item. The plurality of film grain parameters may comprise a film grain pattern, a film grain size, a film grain density, a film grain color, a film grain intensity, a combination thereof, and/or the like. The computing device may determine the plurality of film grain parameters using one or more machine learning techniques. For example, the computing device may determine the plurality of film grain parameters using a neural network (e.g., the neural network 700). The neural network may be trained based on a plurality of training content items that each comprise labeled (e.g., known) film grain parameters. The plurality of film grain parameters may be based on the labeled film grain parameters used for training the neural network. For example, the plurality of film grain parameters may comprise a subset (or an entirety) of the labeled film grain parameters used for training the neural network.

At step 920, the computing device may determine at least one encoding parameter based on the plurality of film grain parameters. The at least one encoding parameter may comprise a component of an encoding cost function. The encoding cost function may be minimized to select a best encoding mode (e.g., a prediction mode) for encoding the content item. The computing device may determine the at least one encoding parameter by determining the component of the encoding cost function for at least a portion of the content item (e.g., a segment, fragment, frame(s), etc.). For example, the computing device may determine the component of the encoding cost function for at least the portion of the content item based on the plurality of film grain parameters associated with at least the portion of the content item. The portion of the content item may comprise a prediction unit (PU), a coding unit (CU), a coding tree unit (CTU), a combination thereof, and/or the like. The component of the encoding cost function may comprise a Lagrangian multiplier, which may be determined based on a quantization parameter (e.g., a compression parameter) associated with the content item. The component of the encoding cost function may comprise a quality factor, which may be determined based on a quality factor that is derived based on the plurality of film grain parameters.

At step 930, the computing device may encode the content item. The computing device may encode a portion—or the entirety—of the content item. The computing device may encode the content item based on the at least one encoding parameter. For example, the computing device may determine a de-noised version of a portion—or the entirety—of the content item based on the plurality of film grain parameters. The de-noised version may lack the film grain noise present in the pre-encoded version of the portion—or the entirety—of the content item. The computing device may encode the de-noised version of the portion—or the entirety—of the content item.

The computing device may determine/generate an encoding message. For example, the computing device may determine/generate the encoding message based on the at least one encoding parameter. The encoding message may comprise a Supplemental Enhancement Information (SEI) message. The computing device may send the encoding message. The computing device may send the encoding message to the at least one user device/client device. The encoding message may cause the at least one user device/client device to decode the content item (e.g., the encoded de-noised version of the portion—or the entirety—of the content item). For example, the at least one user device/client device may use the encoding message to synthesize the film grain noise that was present in the pre-encoded version of the content item. In this way, the encoding message may be used to decode the content item and preserve the visual appearance of the content item (e.g., with the film grain noise).

The method 900 may be used to adaptively process the entire content item (e.g., an entire video) or a portion of the content item (e.g., a frame, segment, fragment, etc.). For example, the entire content item may be adaptively processed to remove noise present within any portion of the content item by determining a plurality of film grain parameters associated with the content item as a whole. As another example, a portion of the content item, such as a frame, a segment, a fragment, etc., may be adaptively processed to remove noise present within that portion by determining a plurality of film grain parameters associated with that portion of the content item. Other examples are possible as well. It is to be understood that the method 900 may be used to adaptively process as much—or as little—of a content item that is desired and/or required.

FIG. 10 shows a flowchart of an example method 1000 for adaptive processing of video content with noise, such as film grain noise. The method 1000 may be performed in whole or in part by a single computing device, a plurality of computing devices, and the like. For example, the steps of the method 1000 may be performed by the encoder 104, the packager 1010, the content server 108, or the user device 112 shown in FIG. 1 and/or a computing device in communication with any of the aforementioned devices/entities. Some steps of the method 1000 may be performed by a first computing device (e.g., the encoder 104), while other steps of the method 1000 may be performed by a second computing device (e.g., the user device 112). For example, the first computing device (e.g., the encoder 104) may process and/or encode a content item, and the second computing device (e.g., the user device 112) may decode and/or output the content item.

At step 1010, a computing device, such as the encoder 104, may determine a plurality of film grain parameters associated with a content item. The plurality of film grain parameters may be associated with film grain noise present within one or more frames of the content item. The plurality of film grain parameters may comprise a film grain pattern, a film grain size, a film grain density, a film grain color, a film grain intensity, a combination thereof, and/or the like. The computing device may determine the plurality of film grain parameters using one or more machine learning techniques. For example, the computing device may determine the plurality of film grain parameters using a neural network (e.g., the neural network 700). The neural network may be trained based on a plurality of training content items that each comprise labeled (e.g., known) film grain parameters. The plurality of film grain parameters may be based on the labeled film grain parameters used for training the neural network. For example, the plurality of film grain parameters may comprise a subset (or an entirety) of the labeled film grain parameters used for training the neural network.

At step 1020, the computing device may determine at least one filtering parameter. The at least one filtering parameter may comprise, for example, an in-loop filter parameter, a deblocking filter parameter, a Sample Adaptive Offset (SAO) filter parameter, or an Adaptive Loop Filter (ALF) parameter. The computing device may increase a value(s) of the at least one filtering parameter to apply stronger filtering/smoothing of the content item during the encoding process in order to remove coding artifacts (e.g., due to utilizing the above-mentioned increased QP) and to further increase video coding gains despite a possible degradation in visual quality due to possible removal of fine details. Such fine details may be perceptually invisible upon synthesizing and adding back the original "heavy" film gain, as described herein.

The computing device may determine the at least one filtering parameter in a variety of ways. For example, the computing device may determine the at least one filtering parameter by determining a strength of a deblocking filter based on the plurality of film grain parameters. As another example, the computing device may determine the at least one filtering parameter by determining a plurality of coding block borders to be filtered based on the plurality of film grain parameters. Each coding block border of the plurality of coding block borders may comprise a vertical direction or a horizontal direction. In determining plurality of coding block borders to be filtered, the computing device may determine a quantity and/or a direction of coding block borders to be filtered.

As a further example, the computing device may determine the at least one filtering parameter by determining a first threshold parameter (e.g., a β parameter) and second threshold parameter. (e.g., a tC parameter). The first threshold parameter and the second threshold parameter may be determined based on a quantization parameter associated with at least two neighboring blocks (e.g., partitions 301) of at least one frame of the content item. The computing device may determine a quantity of block borders to be filtered based on the first threshold parameter. The computing device may determine a strength of a deblocking filter based on the second threshold parameter. The strength of the deblocking filter may be used to determine a plurality of pixels of the at least one frame of the content item to be modified. The plurality of pixels may be associated with a common block border of the at least two neighboring blocks (e.g., partitions 301). The computing device may determine a maximum quantity of modifications for each pixel of the plurality of pixels. For example, the computing device may determine the maximum quantity of modifications based on the strength of the deblocking filter and the quantization parameter.

The computing device may determine an offset for the first threshold parameter and an offset for the second threshold parameter based on the plurality of film grain parameters and the quantization parameter. For example, the computing device may adjust the quantization parameter. The adjustment to the quantization parameter may be used to determine the offset for the first threshold parameter and the offset for the second threshold parameter.

At step 1030, the computing device may encode the content item. The computing device may encode a portion—or the entirety—of the content item. The computing device may encode the content item based on the at least one filtering parameter. For example, the computing device may determine a de-noised version of a portion—or the entirety—of the content item based on the plurality of film grain parameters. The de-noised version may lack the film grain noise present in the pre-encoded version of the portion—or the entirety—of the content item. The computing device may encode the de-noised version of the portion—or the entirety—of the content item.

The computing device may determine/generate an encoding message. For example, the computing device may determine/generate the encoding message based on the at least one encoding parameter/filtering parameter. The encoding message may comprise a Supplemental Enhancement Information (SEI) message. The computing device may send the encoding message. The computing device may send the encoding message to at least one user device/client device. The encoding message may cause the at least one user device/client device to decode the content item (e.g., the encoded de-noised version of the portion—or the entirety—of the content item). For example, the at least one user device/client device may use the encoding message to synthesize the film grain noise that was present in the pre-encoded version of the content item. In this way, the encoding message may be used to decode the content item and preserve the visual appearance of the content item (e.g., with the film grain noise).

The method 1000 may be used to adaptively process the entire content item (e.g., an entire video) or a portion of the content item (e.g., a frame, segment, fragment, etc.). For example, the entire content item may be adaptively processed to remove noise present within any portion of the content item by determining a plurality of film grain parameters associated with the content item as a whole. As another example, a portion of the content item, such as a frame, a segment, a fragment, etc., may be adaptively processed to remove noise present within that portion by determining a plurality of film grain parameters associated with that portion of the content item. Other examples are possible as well. It is to be understood that the method 1000 may be used to adaptively process as much—or as little—of a content item that is desired and/or required.

FIG. 11 shows a flowchart of an example method 1100 for adaptive processing of video content with noise, such as film grain noise. The method 1100 may be performed in whole or in part by a single computing device, a plurality of computing devices, and the like. For example, the steps of the method 1100 may be performed by the encoder 104, the packager 106, the content server 108, or the user device 112 shown in FIG. 1 and/or a computing device in communication with any of the aforementioned devices/entities. Some steps of the method 1100 may be performed by a first computing device (e.g., the encoder 104), while other steps of the method 1100 may be performed by a second computing device (e.g., the user device 112). For example, the first computing device (e.g., the encoder 104) may process and/or encode a content item, and the second computing device (e.g., the user device 112) may decode and/or output the content item.

At step 1110, a computing device, such as the encoder 104, may determine a plurality of film grain parameters associated with a content item. The plurality of film grain parameters may be associated with film grain noise present within one or more frames of the content item. The plurality of film grain parameters may comprise a film grain pattern, a film grain size, a film grain density, a film grain color, a film grain intensity, a combination thereof, and/or the like. The computing device may determine the plurality of film grain parameters using one or more machine learning techniques. For example, the computing device may determine the plurality of film grain parameters using a neural network (e.g., the neural network 700). The neural network may be trained based on a plurality of training content items that each comprise labeled (e.g., known) film grain parameters. The plurality of film grain parameters may be based on the labeled film grain parameters used for training the neural network. For example, the plurality of film grain parameters may comprise a subset (or an entirety) of the labeled film grain parameters used for training the neural network.

At step 1120, the computing device may determine at least one encoding parameter based on the plurality of film grain parameters. The at least one encoding parameter may comprise a component of an encoding cost function. The encoding cost function may be minimized to select a best encoding mode (e.g., a prediction mode) for encoding the content item. The computing device may determine the at least one encoding parameter by determining the component of the encoding cost function for at least a portion of the content item (e.g., a segment, fragment, frame(s), etc.). For example, the computing device may determine the component of the encoding cost function for at least the portion of the content item based on the plurality of film grain parameters associated with at least the portion of the content item. The portion of the content item may comprise a prediction unit (PU), a coding unit (CU), a coding tree unit (CTU), a combination thereof, and/or the like. The component of the encoding cost function may comprise a Lagrangian multiplier, which may be determined based on a quantization parameter (e.g., a compression parameter) associated with the content item. The component of the encoding cost function may comprise a quality factor, which may be determined based on a quality factor that is derived based on the plurality of film grain parameters.

The at least one encoding parameter may comprise at least one filtering parameter. The computing device may determine the at least one filtering parameter in a variety of ways. For example, the computing device may determine the at least one filtering parameter by determining a strength of a deblocking filter based on the plurality of film grain parameters. As another example, the computing device may determine the at least one filtering parameter by determining a plurality of coding block borders to be filtered based on the plurality of film grain parameters. Each coding block border of the plurality of coding block borders may comprise a vertical direction or a horizontal direction. In determining plurality of coding block borders to be filtered, the computing device may determine a quantity and/or a direction of coding block borders to be filtered.

As a further example, the computing device may determine the at least one filtering parameter by determining a first threshold parameter (e.g., a β parameter) and second threshold parameter. (e.g., a tC parameter). The first threshold parameter and the second threshold parameter may be determined based on a quantization parameter associated with at least two neighboring blocks (e.g., partitions 301) of at least one frame of the content item. The computing device may determine a quantity of block borders to be filtered based on the first threshold parameter. The computing device may determine a strength of a deblocking filter based on the second threshold parameter. The strength of the deblocking filter may be used to determine a plurality of pixels of the at least one frame of the content item to be modified. The plurality of pixels may be associated with a common block border of the at least two neighboring blocks (e.g., partitions 301). The computing device may determine a maximum quantity of modifications for each pixel of the plurality of pixels. For example, the computing device may determine the maximum quantity of modifications based on the strength of the deblocking filter and the quantization parameter. The computing device may determine an offset for the first threshold parameter and an offset for the second threshold parameter based on the plurality of film grain parameters and the quantization parameter. For example, the computing device may adjust the quantization parameter, and the adjustment to the quantization parameter may be used to determine the offset for the first threshold parameter and the offset for the second threshold parameter.

At step 1130, the computing device may encode the content item. The computing device may encode a portion—or the entirety—of the content item. The computing device may encode the content item based on the at least one encoding parameter/filtering parameter. For example, the computing device may determine a de-noised version of a portion—or the entirety—of the content item based on the plurality of film grain parameters. The de-noised version may lack the film grain noise present in the pre-encoded version of the portion—or the entirety—of the content item. The computing device may encode the de-noised version of the portion—or the entirety—of the content item.

At step 1140, the computing device may determine/generate an encoding message. For example, the computing device may determine/generate the encoding message based on the at least one encoding parameter/filtering parameter. The encoding message may comprise a Supplemental Enhancement Information (SEI) message. At step 1150, the computing device may send the encoding message. The computing device may send the encoding message to at least one user device/client device. The encoding message may cause the at least one user device/client device to decode the content item (e.g., the encoded de-noised version of the portion—or the entirety—of the content item). For example, the at least one user device/client device may use the encoding message to synthesize the film grain noise that was present in the pre-encoded version of the content item. In this way, the encoding message may be used to decode the content item and preserve the visual appearance of the content item (e.g., with the film grain noise).

The method 1100 may be used to adaptively process the entire content item (e.g., an entire video) or a portion of the content item (e.g., a frame, segment, fragment, etc.). For example, the entire content item may be adaptively processed to remove noise present within any portion of the content item by determining a plurality of film grain parameters associated with the content item as a whole. As another example, a portion of the content item, such as a frame, a segment, a fragment, etc., may be adaptively processed to remove noise present within that portion by determining a plurality of film grain parameters associated with that portion of the content item. Other examples are possible as well. It is to be understood that the method 1100 may be used to adaptively process as much—or as little—of a content item that is desired and/or required.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:
1. A method comprising:
  determining, by a computing device via a convolutional neural network (CNN), a plurality of film grain parameters associated with film grain noise present within one or more frames of a content item, wherein the CNN is trained based on a plurality of training content items that each comprise at least a subset of the plurality of film grain parameters associated with the content item;
  determining, based on the plurality of film grain parameters, at least one encoding parameter and a de-noised version of the content item, wherein the de-noised version lacks the film grain noise;

encoding, based on the at least one encoding parameter, the de-noised version of the content item; and sending, to a client device, an encoding message, wherein the encoding message causes the client device to output one or more frames of the encoded de-noised version of the content item with the film grain noise based on the plurality of film grain parameters.

2. The method of claim 1, wherein the plurality of film grain parameters comprises a film grain pattern, a film grain size, a film grain density, a film grain color, and a film grain intensity.

3. The method of claim 1, further comprising: based on the encoding message, synthesizing, by the client device, the film grain noise into the encoded de-noised version of the content item.

4. The method of claim 1, wherein determining the at least one encoding parameter comprises determining, for at least a portion of the content item, based on the plurality of film grain parameters, a component of an encoding cost function.

5. The method of claim 4, wherein the component of the encoding cost function comprises at least one of:
a Lagrangian multiplier, and wherein the method further comprises determining, based on a quantization parameter, the Lagrangian multiplier; or
a quality factor, and wherein the method further comprises: determining, based on the plurality of film grain parameters, the quality factor.

6. The method of claim 1, wherein encoding the de-noised version of the content item comprises:
determining, based on the plurality of film grain parameters, an amount of film grain in an original version of the content item;
determining, based on the amount of film grain in the original version, a quantization parameter (QP) for encoding at least one portion of the content item, and
encoding, based on the QP, the de-noised version of the content item.

7. The method of claim 1,
wherein the encoding message causes the client device to decode the encoded de-noised version of the content item based on the at least one encoding parameter and the plurality of film grain parameters.

8. A method comprising:
determining, by a computing device via a convolutional neural network (CNN), a plurality of film grain parameters associated with film grain noise present within one or more frames of a content item, wherein the CNN is trained based on a plurality of training content items that each comprise at least a subset of the plurality of film grain parameters associated with the content item;
determining, based on the plurality of film grain parameters, at least one encoding parameter and a de-noised version of the content item, wherein the de-noised version lacks the film grain noise;
encoding, based on the at least one encoding parameter, the de-noised version of the content item; and
determining, based on the at least one encoding parameter, an encoding message, wherein the encoding message facilitates output of one or more frames of the encoded de-noised version of the content item with the film grain noise based on the plurality of film grain parameters.

9. The method of claim 8, further comprising sending, to a client device, the encoding message, wherein the encoding message causes the client device to output the one or more frames of the encoded de-noised version of the content item with the film grain noise based on the plurality of film grain parameters.

10. The method of claim 8, wherein the plurality of film grain parameters comprises a film grain pattern, a film grain size, a film grain density, a film grain color, and a film grain intensity.

11. The method of claim 8, wherein the CNN is trained based on training content that comprises at least a subset of the plurality of film grain parameters.

12. The method of claim 8, wherein the at least one encoding parameter comprises a component of an encoding cost function, and wherein determining the at least one encoding parameter comprises: determining, for at least a portion of the content item, based on the plurality of film grain parameters, the component of the encoding cost function.

13. The method of claim 8, wherein determining the at least one encoding parameter comprises determining at least one filtering parameter.

14. A method comprising:
determining, by a computing device via a convolutional neural network (CNN), a plurality of film grain parameters associated with film grain noise present within one or more frames of a content item, wherein the CNN is trained based on a plurality of training content items that each comprise at least a subset of the plurality of film grain parameters associated with the content item;
determining, based on the plurality of film grain parameters, at least one encoding parameter and a de-noised version of the content item, wherein the de-noised version lacks the film grain noise; and
causing, based on the plurality of film grain parameters, output of one or more frames of the de-noised version of the content item with the film grain noise.

15. The method of claim 14, wherein the plurality of film grain parameters comprises a film grain pattern, a film grain size, a film grain density, a film grain color, and a film grain intensity.

16. The method of claim 14, wherein causing output of the one or more frames comprises: sending, to a client device, an encoding message, wherein the encoding message causes the client device to output the one or more frames of the encoded de-noised version of the content item with the film grain noise based on the plurality of film grain parameters.

17. The method of claim 14, wherein determining the at least one encoding parameter comprises determining, for at least a portion of the content item, based on the plurality of film grain parameters, a component of an encoding cost function.

18. The method of claim 17, wherein the component of the encoding cost function comprises at least one of:
a Lagrangian multiplier, and wherein the method further comprises determining, based on a quantization parameter, the Lagrangian multiplier; or
a quality factor, and wherein the method further comprises: determining, based on the plurality of film grain parameters, the quality factor.

19. The method of claim 14, further comprising determining, based on the at least one encoding parameter, an encoding message, wherein the encoding message facilitates output of the one or more frames of de-noised version of the content item with the film grain noise based on the plurality of film grain parameters.

20. The method of claim 14, further comprising encoding, based on the at least one encoding parameter, the de-noised version of the content item.

* * * * *